(12) United States Patent
Sato et al.

(10) Patent No.: US 9,229,142 B2
(45) Date of Patent: Jan. 5, 2016

(54) OPTICAL FILM, POLARIZING PLATE, LIQUID CRYSTAL DISPLAY, AND METHOD OF MANUFACTURING OPTICAL FILM

(71) Applicant: FUJIFILM Corporation, Tokyo (JP)

(72) Inventors: Hiroshi Sato, Kanagawa (JP); Yukito Saitoh, Kanagawa (JP); Mitsuyoshi Ichihashi, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 74 days.

(21) Appl. No.: 14/140,910

(22) Filed: Dec. 26, 2013

(65) Prior Publication Data
US 2014/0184988 A1    Jul. 3, 2014

(30) Foreign Application Priority Data

Dec. 28, 2012  (JP) .................................. 2012-287038
Dec. 20, 2013  (JP) .................................. 2013-263592

(51) Int. Cl.
G02F 1/1347    (2006.01)
G02F 1/1335    (2006.01)
(Continued)

(52) U.S. Cl.
CPC ................ *G02B 5/3016* (2013.01); *G02B 1/04* (2013.01); *G02F 2413/02* (2013.01); *G02F 2413/10* (2013.01); *G02F 2413/11* (2013.01)

(58) Field of Classification Search
CPC ............ G02F 1/13471; G02F 1/13363; G02F 1/1393; G02F 1/1323; G02F 1/133636; G02F 18/133528; G02F 2001/133543; G02F 1/133536; G02F 1/133634; G02B 5/3033; G02B 5/3083; G02B 5/2016

USPC ....................... 349/75, 96, 194, 117
See application file for complete search history.

(56) References Cited

U.S. PATENT DOCUMENTS 6,380,996 B1 *  4/2002  Yokoyama et al. ........... 349/117
6,893,585 B2     5/2005  Ichihashi
(Continued)

FOREIGN PATENT DOCUMENTS

JP    2000-304930 A    11/2000
JP    2003-082352 A     3/2003
(Continued)

OTHER PUBLICATIONS

Japanese Office Action issued by the Japanese Patent Office on Nov. 4, 2014 in connection with Japanese Patent Application No. 2013-263592.

(Continued)

*Primary Examiner* — Mike Qi
(74) *Attorney, Agent, or Firm* — Jean C. Edwards, Esq.; Edwards Neils PLLC

(57) ABSTRACT

Provided is an optical film which is resistant to repelling, bright dots, irregularity, and the use of such an optical film in a liquid crystal display leads to high front contrast, reduced grayscale inversion, and a reduced difference between a front image and an oblique image in grayscale reproducibility and color. The optical film including a first optically anisotropic layer; and a second optically anisotropic layer on the first optically anisotropic layer, wherein the first optically anisotropic layer is a layer of liquid crystal compounds aligned and fixed by polymerization, and the surface tilt angle of molecules of the liquid crystal compound is in a range of 5° to 80° at a site in contact with the second optically anisotropic layer.

18 Claims, 3 Drawing Sheets

(51) Int. Cl.
*G02F 1/13* (2006.01)
*G02B 5/30* (2006.01)
*G02B 1/04* (2006.01)

(56) References Cited

U.S. PATENT DOCUMENTS

| | | | |
|---|---|---|---|
| 6,937,307 B1* | 8/2005 | Ito et al. | 349/117 |
| 7,057,690 B2 | 6/2006 | Ito et al. | |
| 7,443,474 B2 | 10/2008 | Ito et al. | |
| 8,179,501 B2 | 5/2012 | Takahashi et al. | |
| 2003/0122105 A1 | 7/2003 | Ichihashi | |
| 2004/0114078 A1* | 6/2004 | Ishikawa et al. | 349/117 |
| 2005/0127326 A1 | 6/2005 | Ichihashi | |
| 2005/0200780 A1 | 9/2005 | Ito et al. | |
| 2006/0176428 A1 | 8/2006 | Ito et al. | |
| 2009/0237599 A1* | 9/2009 | Nagai | 349/76 |
| 2010/0007828 A1* | 1/2010 | Nimura et al. | 349/117 |
| 2011/0116004 A1 | 5/2011 | Takahashi et al. | |

FOREIGN PATENT DOCUMENTS

| | | |
|---|---|---|
| JP | 2005-301235 | 10/2005 |
| JP | 2005-321527 | 11/2005 |
| JP | 2006-523864 | 10/2006 |
| JP | 2009-075533 A | 4/2009 |
| JP | 2010-054759 | 3/2010 |
| JP | 2011-033790 A | 2/2011 |
| WO | WO 2004/092815 | 10/2004 |

OTHER PUBLICATIONS

Japanese Office Action issued by the Japanese Patent Office on Jun. 2, 2015 in connection with Japanese Patent Application No. 2013-263592.

* cited by examiner

OPTICAL FILM, POLARIZING PLATE, LIQUID CRYSTAL DISPLAY, AND METHOD OF MANUFACTURING OPTICAL FILM

CROSS-REFERENCE TO RELATED APPLICATIONS

The present application claims the benefit of priority from Japanese Patent Application No. 287038/2012, filed on Dec. 28, 2012, and Japanese Patent Application No. 263592/2013, filed on Dec. 20, 2013, the content of which are herein incorporated by reference in their entirety.

TECHNICAL FIELD

The present invention relates to an optical film, a polarizing plate, a liquid crystal display, and a method of manufacturing the optical film.

BACKGROUND ART

A Known liquid crystal display includes a liquid crystal cell, a polarizing film, and an optical film for optical compensation (also referred to as an optically-compensatory film or retardation film).

A transparent liquid crystal display includes two polarizing films on both surfaces of a liquid crystal cell, and one or more optically-compensatory films between the liquid crystal cell and the polarizing films. A reflective liquid crystal display has, in sequence, a reflector, a liquid crystal cell, an optically-compensatory film, and a polarizing film. A liquid crystal cell consists of rod-like liquid crystal molecules, two substrates encapsulating the molecules, and electrode layers for applying voltage to the molecules. Liquid crystal cells are categorized into various display modes by the alignment states of their rod-like liquid crystal molecules. For instance, transparent displays are present in various display modes, such as twisted nematic (TN), in-plane switching (IPS), ferroelectric liquid crystal (FLC), optically compensatory bend (OCB), super twisted nematic (STN), vertically aligned (VA), and electrically controlled birefringence (ECB) modes. Reflective displays are present in TN cells, hybrid aligned nematic (HAN) and guest-host (GH) modes.

Optically-compensatory films are used in various liquid crystal displays to avoid coloring of images or increase the viewing angles. Traditional optically-compensatory films include stretched birefringent polymer films. As an alternative for an optical compensatory film composed of a stretched birefringent film, optically-compensatory films are currently proposed which include an optically anisotropic layer consisting of a support coated with an aligned liquid crystal compound. Liquid crystal compounds have a variety of alignment states and thus can provide optical properties that cannot be accomplished by traditional stretched birefringent polymer films.

The optical properties of an optically-compensatory film depend on the optical properties or display mode of the liquid crystal cell. The use of a liquid crystal compound allows for the manufacture of an optically-compensatory film having different optical properties suitable for various display modes of the liquid crystal cell. Examples of such an optically-compensatory film include a laminate of two optically anisotropic layers, which is disclosed in Japanese Unexamined Patent Application Publication No. 2000-304930.

In particular, Japanese Unexamined Patent Application Publication No. 2000-304930 discloses an optically-compensatory film in FIG. 6 including, in sequence, a support 1', a rubbed first alignment film 2', a first optically anisotropic layer 3', a rubbed second alignment film 2', and a second optically anisotropic layer 4', the second alignment film 2' being on the first optically anisotropic layer 3' and aligning liquid crystal compounds in the second optically anisotropic layer 4'.

SUMMARY OF INVENTION

Technical Problem

A laminate of two or more optically anisotropic layers in Japanese Unexamined Patent Application Publication No. 2000-304930 is formed by laminating, in sequence, a first optically anisotropic layer, an alignment film, and a second optically anisotropic layer, resulting in increases in laminated layers and thus low productivity.

FIG. 7 illustrates another optically-compensatory film including, in sequence, a support 1', a rubbed first alignment film 2', a first optically anisotropic layer 3', and a second optically anisotropic layer 4', the first optically anisotropic layer 3' having a rubbed surface, the second optically anisotropic layer 4' containing an aligned liquid crystal compound. The second optically anisotropic layer 4' is provided directly on the surface of the first optically anisotropic layer 3'. Rubbing the surface of the first optically anisotropic layer 3' leaves rubbing debris that increase the risks of repelling, bright dots, and irregularity in the resulting optical film.

An object of the present invention, which has been made to solve such problems, is to provide an optical film including two or more optically anisotropic layers which is resistant to repelling, bright dots, and irregularity.

Solution to Problem

The inventors have studied to solve the problems and found that an optical film can be formed which includes a first optically anisotropic layer and a second optically anisotropic layer on a surface of the first optically anisotropic layer, wherein the surface tilt angle in the first optically anisotropic layer is in the range of 5° to −80° so that a liquid crystal compound in the second optically anisotropic layer can be aligned without an alignment film or rubbing.

The problems were solved by the configuration <1>, preferably by configurations <2> to <14> below.

<1> An optical film comprising: a first optically anisotropic layer; and a second optically anisotropic layer on the surface of the first optically anisotropic layer, wherein the first optically anisotropic layer is a layer of liquid crystal compounds which are aligned and fixed by polymerization, and the surface tilt angle of the liquid crystal compounds is in a range of 5° to 80° at a site in contact with the second optically anisotropic layer.

<2> The optical film according to <1>, wherein a slow axis of the first optically anisotropic layer and a slow axis of the second optically anisotropic layer are orthogonal to each other.

<3> The optical film according to <1> or <2>, wherein a surfactant is eccentrically-located at a side of the surface of the first optically anisotropic layer, the surface being in contact with the second optically anisotropic layer.

<4> The optical film according to any one of <1> to <3>, wherein the first optically anisotropic layer contains rod-like liquid crystal compounds and the second optically anisotropic layer contains discotic liquid crystal compounds; or wherein the first optically anisotropic layer contains discotic liquid crystal compounds and the second optically anisotropic layer contains rod-like liquid crystal compounds.

<5> The optical film according to any one of <1> to <4>, the optical film being intended for use in a birefringent-mode liquid crystal display.

<6> The optical film according to any one of <1> to <5>, wherein the sum of an Re value of the first optically anisotropic layer and an Re value of the second optically anisotropic layer is in a range of −75 nm to 25 nm, each Re value indicating an in-plane retardation at a wavelength of 550 nm and being measured with reference to a slow axis of the first optically anisotropic layer.

<7> A hpolarizing plate comprising: a polarizing film; and protective films on both surfaces of the polarizing film, at least one of the protective films comprising the optical film according to any one of <1> to <6>.

<8> The polarizing plate according to <7>, wherein at least one of the protective films is the optical film according to any one of <1> to <6>, and the polarizing film is bonded to an alignment film or an optically anisotropic layer through an adhesive layer.

<9> The polarizing plate according to <7>, wherein at least one of the protective films is the optical film according to any one of <1> to <6>, the optical film comprising, in sequence, the polarizing film, a support, an alignment film, the first optically anisotropic layer, and the second optically anisotropic layer.

<10> A liquid crystal display comprising the optical film according to any one of <1> to <6> or the polarizing plate according to any one of <7> to <9>.

<11> A liquid crystal display comprising: a pair of polarizing plates; and a TN-mode liquid crystal cell between the pair of polarizing plates, wherein at least one of the pair of polarizing plates is the polarizing plate according to any one of <7> to <9> and comprises the second optically anisotropic layer near to the TN-mode liquid crystal cell.

<12> A liquid crystal display comprising: a pair of polarizing plates disposed in a birefringent mode; and a TN-mode liquid crystal cell between the pair of polarizing plates, wherein at least one of the pair of polarizing plates is the polarizing plate according to any one of <7> to <9> and the second optically anisotropic layer is disposed so as to be near to the TN-mode liquid crystal cell, and the sum of an Re value of the first optically anisotropic layer and an Re value of the second optically anisotropic layer is in a range of −75 nm to 25 nm, each Re value having a negative or positive sign, the negative sign corresponding to the direction of a director of liquid crystal molecules at a site in contact with a surface of the substrate near to the liquid crystal cell, the positive sign corresponding to a direction orthogonal to the direction of the director of the liquid crystal molecules.

<13> A method of manufacturing the optical film according to any one of <1> to <6>, comprising forming a second optically anisotropic layer by directly coating an unrubbed surface of the first optically anisotropic layer with a composition containing liquid crystal compounds, and aligning and fixing the liquid crystal compounds by polymerization.

<14> The method of manufacturing the optical film according to <13>, comprising forming the first optically anisotropic layer by coating of a composition comprising liquid crystal compounds and a surfactant, and aligning and fixing the liquid crystal compounds by polymerization.

The present invention provides an optical film including two or more optically anisotropic layers which is resistant to repelling, bright dots, and irregularity.

DESCRIPTION OF EMBODIMENTS

The invention is described in detail hereinunder. Note that, in this patent specification, any numerical expressions in a style of " . . . to . . . " will be used to indicate a range including the lower and upper limits represented by the numerals given before and after "to", respectively.

<Optical Film>

An optical film of the invention includes a first optically anisotropic layer and a second optically anisotropic layer on a surface of the first optically anisotropic layer, the first optically anisotropic layer being a layer of liquid crystal compounds which are aligned and fixed by polymerization, wherein the liquid crystal compounds have a surface tilt angle of 5 to 80° at a site in contact with the second optically anisotropic layer. This structure allows the second optically anisotropic layer to be directly formed on the surface of the first optically anisotropic layer without rubbing the surface of the first optically anisotropic layer. The use of such an optical film in a liquid crystal display leads to high front contrast, reduced grayscale inversion, and a reduced difference between a front image and an oblique image in grayscale reproducibility and color.

Structures according to the invention will now be described with reference to the attached drawings. It should be appreciated that the present invention is not limited to these structures.

Figure 1:
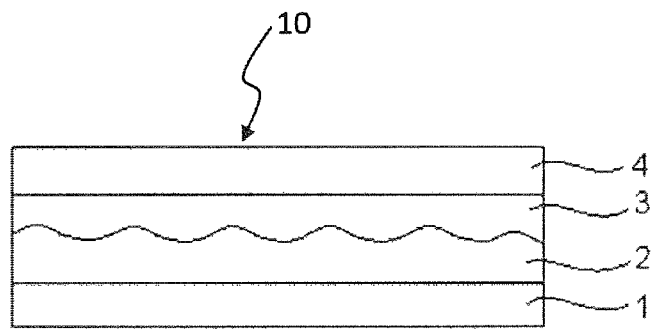
FIG. 1 is a schematic cross-sectional view illustrating an example optical film of the invention.

FIG. 1 is a schematic cross-sectional view illustrating an example optical film of the invention. An optical film of the invention includes a first optically anisotropic layer 3 and a second optically anisotropic layer 4 on a surface of the first optically anisotropic layer 3, and optionally a rubbed alignment film 2 aligning liquid crystal compounds in the first optically anisotropic layer 3, and a support 1 supporting the alignment film 2 and the first optically anisotropic layer 3.

As described below, a temporary support preferably substitutes for the support 1 so that the optical film can be composed of a laminate of the alignment film 2, the first optically anisotropic layer 3, and the second optically anisotropic layer 4.

(First Optically Anisotropic Layer)

The first optically anisotropic layer is a layer of liquid crystal compounds which are aligned and fixed by polymerization. In a composition of liquid crystal compounds and a solvent which is applied to a surface of the alignment film, the molecules of the liquid crystal compound on the front surface side usually have a tilt angle parallel to the director. In the present invention, the molecules of the liquid crystal compound have a surface tilt angle of 5 to 80° at a site in contact with the second optically anisotropic layer.

The surface tilt angle refers to an angle between a surface (air interface), in contact with the second optically anisotropic layer, of the first optically anisotropic layer and the liquid crystal compound (a disk surface for a discoid compound or the major axis for a rod-like compound).

The surface tilt angle is in the range of 5° to 80°, preferably 5° to 75°, more preferably 5° to 45°. With a surface tilt angle of 5 to 80°, the first optically anisotropic layer can align the liquid crystal compound in the second optically anisotropic layer, allowing the second optically anisotropic layer to be directly formed on the surface of the first optically anisotropic layer without rubbing the surface of the first optically anisotropic layer.

The surface tilt angle of the molecules of the liquid crystal compound at a site in contact with the second optically anisotropic layer may be established in the range of 5° to 80° by any approach preferably with a surfactant unevenly distributed on the surface, in contact with the second optically anisotropic layer, of the first optically anisotropic layer. Unevenly distributing a surfactant means to dispose a surfactant on the surface, in contact with the second optically anisotropic layer, of the first optically anisotropic layer in larger amounts than on a surface, remote from the second optically anisotropic layer, of the first optically anisotropic layer.

The surfactant may be a single surfactant or a mixture of two or more surfactants.

Instead of the addition of the surfactant, a second liquid crystal compound is preferably added for the establishment of the surface tilt angle in the first optically anisotropic layer in the range of 5° to 80°. If the surface tilt angle depends on temperature, the temperature is controlled to adjust the surface tilt angle to a preferred value.

This surfactant is also referred to as air-interface-side alignment adjustor, which can establish the surface tilt angle of the molecules of the liquid crystal compound in the range of 5° to 80°. In particular, the surfactant may be any of the following compounds:

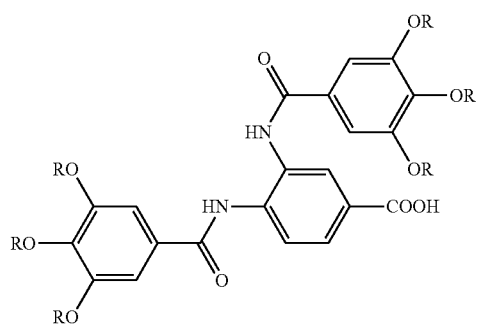

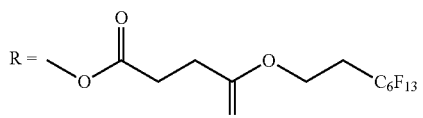

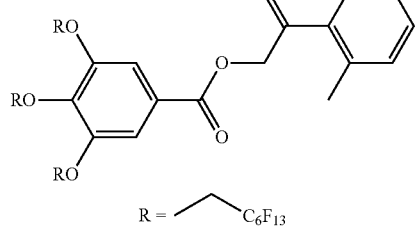

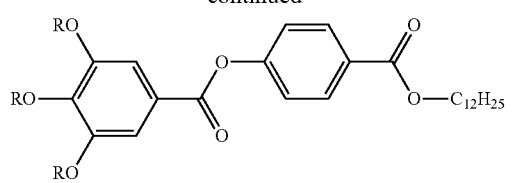

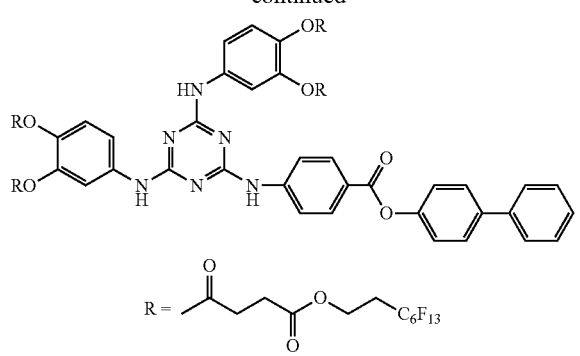
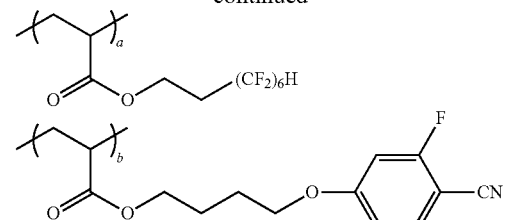
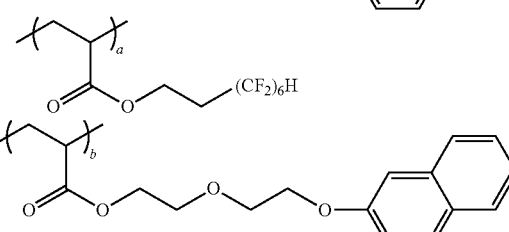
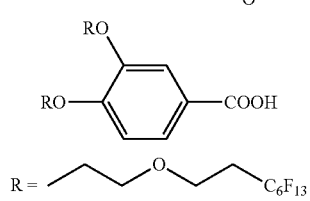
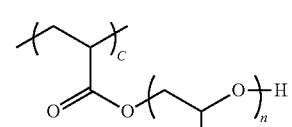
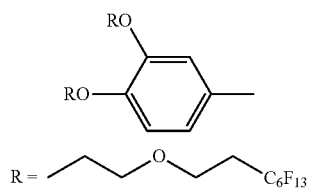
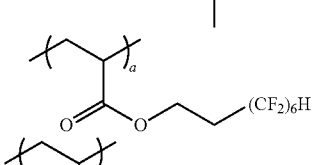
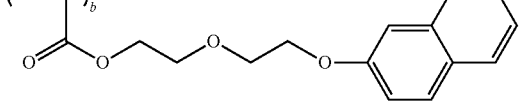
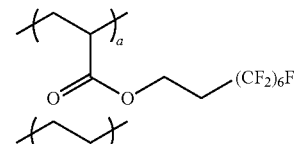
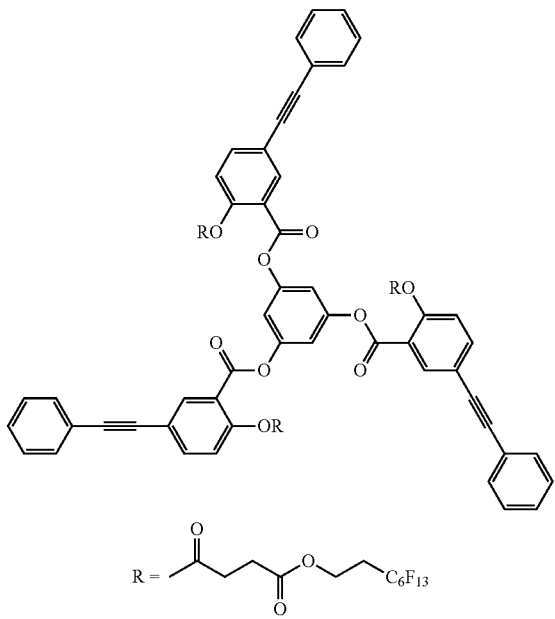
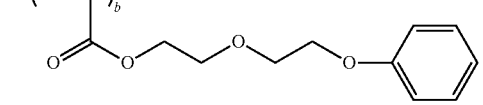
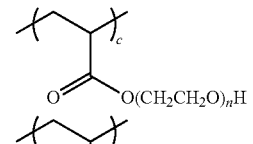
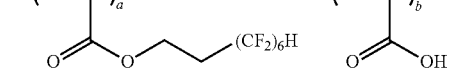
For a higher surface tilt angle, the second liquid crystal compound may be any of the following compounds:
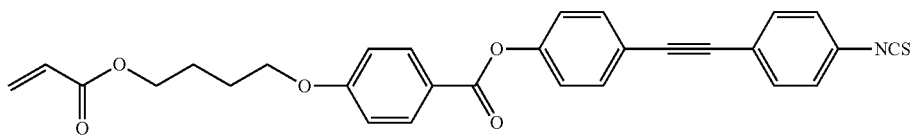
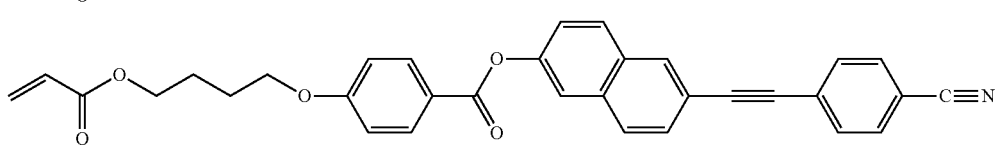

-continued
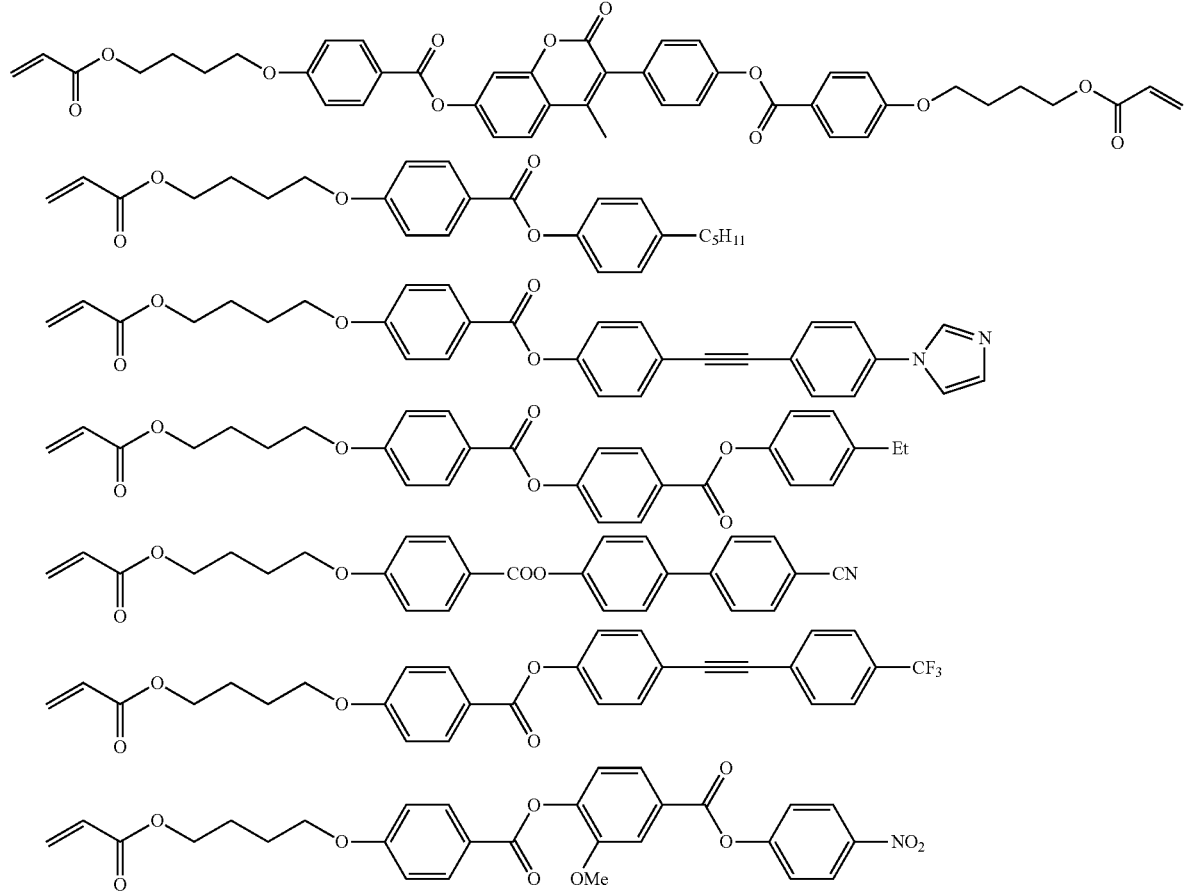
For a lower surface tilt angle, the second liquid crystal compound may be any of the following compounds:
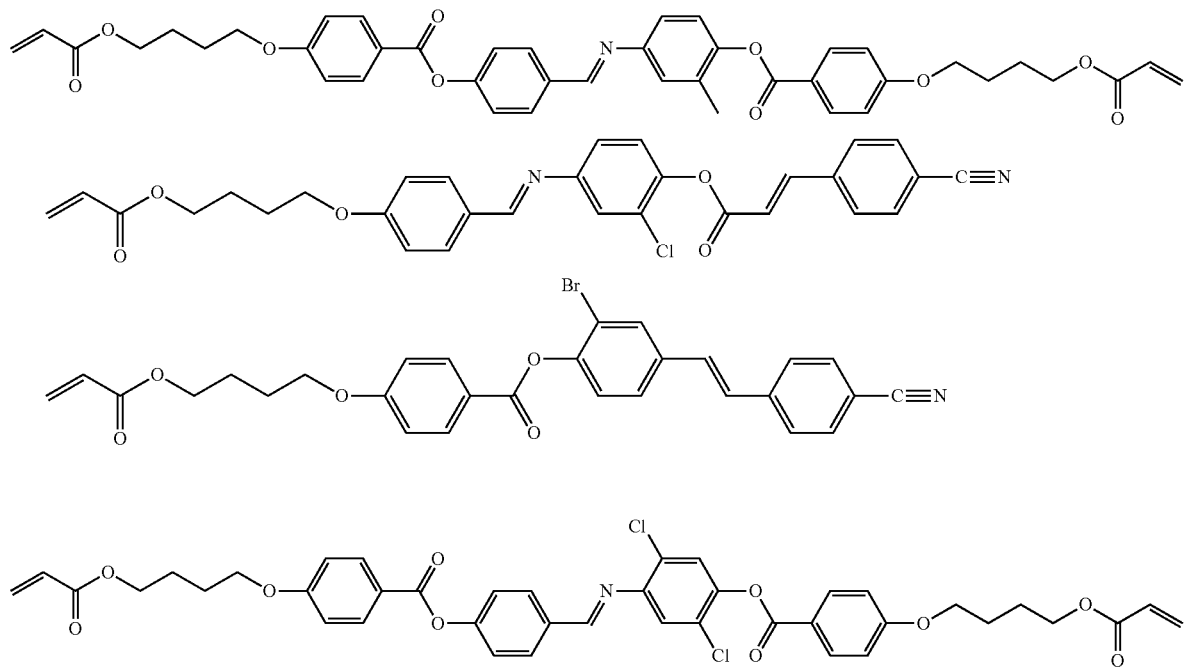

-continued

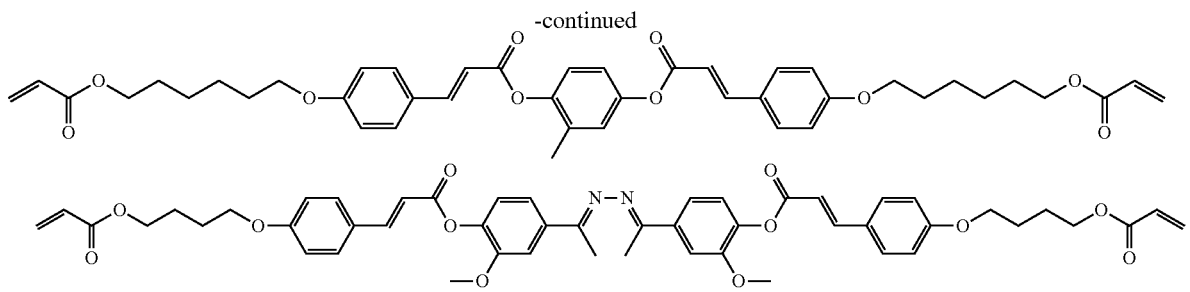

The surfactant is preferably added in an amount of 0.01 to 10 parts by mass, more preferably 0.03 to 5 parts by mass, more preferably 0.1 to 3 parts by mass for 100 parts by mass of the liquid crystal compound.

The second liquid crystal compound is preferably added in an amount of 2 to 50 parts by mass, more preferably 5 to 40 parts by mass, more preferably 10 to 30 parts by mass for 100 parts by mass of the liquid crystal compound.

Any liquid crystal compound may be used for the first optically anisotropic layer. Liquid crystal compounds are usually categorized by the shape into a rod-like type and a discoid type. These types of liquid crystal compounds are further classified into low-polymer compounds and high-polymer compounds. A high-polymer compound usually refers to a compound exhibiting a degree of polymerization of 100 or more (Kobunshi Butsuri, Souten-i Dynamics (Polymer Physics-Dynamics of Phase Transition), Masao Doi, p. 2, published by Iwanami, 1992). The invention may employ any of these liquid crystal compounds, preferably a rod-like liquid crystal compound or a discotic liquid crystal compound. Alternatively, the invention may employ two or more rod-like liquid crystal compounds, two or more discotic liquid crystal compounds, or a mixture of one or more rod-like liquid crystal compounds and one or more discotic liquid crystal compounds. For a reduced variation in temperature or humidity, the invention preferably employs a rod-like or discotic liquid crystal compound having one or more reactive groups, more preferably a rod-like or discotic liquid crystal compound having two or more reactive groups in one liquid crystal molecule. Two or more liquid crystal compounds may be used in combination at least one of which preferably has two or more reactive groups.

Examples of preferred rod-like liquid crystal compounds include those disclosed in Published Japanese Translation of PCT International Publication for Patent Application No. H11-513019 and Japanese Unexamined Patent Application Publication No. 2007-279688, the contents of which are incorporated in this specification. Examples of the preferred discotic liquid crystal compounds include those disclosed in Japanese Unexamined Patent Application Publication Nos. 2007-108732 and 2010-244038, the contents of which are incorporated in this specification.

It is also preferred the liquid crystal compound have two or more reactive groups having different polymerization characteristics. In this case, an optically anisotropic layer containing a polymer having unreacted reactive groups can be produced through selective polymerization of the different reactive groups under controlled conditions. The difference in polymerization conditions may be a difference in wavelength region of ionizing radiation for polymerization immobilization or a difference in polymerization mechanism, but is preferably a difference in combination of a radical reactive group and a cationic reactive group, which is controllable by the type of a polymerization initiator. A combination of a radical reactive group of an acrylic and/or methacrylic group and a cationic reactive group of a vinyl ether, oxetane, and/or epoxy group facilitates the control of the reactivity and is therefore particularly preferred.

For the first optically anisotropic layer, the evenness of the coated film, the strength of the film, the alignment of the liquid crystal molecules, and other properties can be improved by using additives such as a plasticizer and a polymer monomer with the liquid crystal compound and the surfactant. Preferred additives are compatible with liquid crystal molecules, and can change the tilt angles of the liquid crystal molecules or do not affect the alignment of liquid crystal molecules. In particular, examples of the preferred additives include those disclosed in Japanese Unexamined Patent Application Publication Nos. 2002-296423, 2001-330725, and 2000-155216, the contents of which are incorporated in this specification.

The first optically anisotropic layer can be prepared by coating the alignment film with, for example, a coating solution of a composition of liquid crystal compounds, a surfactant, and other components, by any coating process.

In the first optically anisotropic layer, the liquid crystal compound aligned on a surface of, for example, the alignment film has an alignment state fixed by polymerization. The fixation is preferably achieved by a polymerization reaction. Examples of the polymerization reaction include thermal polymerization with thermal polymerization initiators, and photo polymerization with photo polymerization initiators. Here, photo polymerization reaction is preferred.

The photo polymerization initiator is added to a composition in an amount of preferably 0.01 to 20 mass %, more preferably 0.5 to 5 mass % of the composition (solid content for a coating solution).

The light used for irradiation of the liquid crystal compound for polymerization is preferably ultraviolet light. The irradiation energy is preferably 20 mJ/cm$^2$ to 50 J/cm$^2$, more preferably 20 to 5000 mJ/cm$^2$, further more preferably 100 to 800 mJ/cm$^2$. In order to facilitate the photo polymerization, the light irradiation may be performed under an atmosphere of inert gas such as nitrogen or under heating.

The in-plane retardation Re of the first optically anisotropic layer at a wavelength of 550 nm is preferably in the range of 10 nm to 90 nm, more preferably 20 nm to 80 nm, more preferably 30 nm to 70 nm. Here, the in-plane retardation Re is measured with reference to the direction along the slow axis of the first optically anisotropic layer.

The alignment state of the first optically anisotropic layer is most preferably a homogeneous alignment in which the director of the liquid crystal molecules is parallel to the surfaces of the substrates and the molecules are aligned in the thickness direction. The liquid crystal layer can be preferably used even when having any tilt angle. The liquid crystal layer can also be preferably used even when having a hybrid alignment where the top layer and the bottom layer of a liquid crystal layer have different tilt angles and the tilt angle smoothly varies between the top layer and the bottom layer.

The first optically anisotropic layer preferably has a thickness of 0.05 to 5 μm, more preferably 0.1 to 2 μm, more preferably 0.2 to 1 μm.

The surface, in contact with the second optically anisotropic layer, of the first optically anisotropic layer usually has a surface roughness (Ra) of 3 nm or less, preferably 0.5 nm or less.

(Second Optically Anisotropic Layer)

The second optically anisotropic layer is, for example, on the surface of the first optically anisotropic layer and is formed by directly coating an unrubbed surface of the first optically anisotropic layer with a composition containing liquid crystal compounds, and aligning and fixing the liquid crystal compound by polymerization.

The liquid crystal compound for the second optically anisotropic layer is usually different from the liquid crystal compound for the first optically anisotropic layer. For the optical film of the present invention, it is preferred that one of the first and second optically anisotropic layers be of a rod-like liquid crystal compound and the other be of a discotic liquid crystal. This configuration can widen the range of the angle that can compensate for the retardation. In particular, it is preferred that the first optically anisotropic layer contain a rod-like liquid crystal compound while the second optically anisotropic layer contain a discotic liquid crystal. Alternatively, it is preferred that the first optically anisotropic layer contain a discotic liquid crystal while the second optically anisotropic layer contain a rod-like liquid crystal compound.

The second optically anisotropic layer may contain the same liquid crystal compound as the first optically anisotropic layer. Similarly, the additive contained in the second optically anisotropic layer may be the same as that contained in the first optically anisotropic layer.

For the formation of the second optically anisotropic layer, a surfactant serving as an air-interface-side alignment adjustor is not necessarily added.

The second optically anisotropic layer can be formed as in the first optically anisotropic layer, i.e., can be prepared by coating the surface of the first optically anisotropic layer with, for example, a coating solution of a composition containing liquid crystal compounds, by any coating process. The liquid crystal compound in the second optically anisotropic layer is polymerized as in the manner in the first optically anisotropic layer.

The alignment state of the second optically anisotropic layer is preferably a hybrid alignment for successfully cancelling the retardation in the liquid crystal layer of the liquid crystal panel.

The in-plane retardation Re of the second optically anisotropic layer at a wavelength of 550 nm is preferably in the range of 5 nm to 65 nm, more preferably 15 nm to 55 nm, more preferably 25 nm to 45 nm.

Here, the in-plane retardation Re is measured with reference to the direction along the slow axis of the second optically anisotropic layer.

The second optically anisotropic layer preferably has a thickness of 0.5 to 5 μm, more preferably 1 to 4 μm, more preferably 1.5 to 3 μm.

[Relation Between First Optically Anisotropic Layer and Second Optically Anisotropic Layer]

In an optical film of the invention, the slow axis of the first optically anisotropic layer is preferably orthogonal to that of the second optically anisotropic layer. Such a structure leads to reduced grayscale inversion, a reduced difference between a front image and an oblique image in grayscale reproducibility and color, high front contrast, and satisfactory front transmittance.

In a preferred embodiment of the invention, the optical film has a sum of the in-plane retardations Re of the first and second optically anisotropic layers in the range of −75 nm to 25 nm. Such an optical film is preferably used in a birefringent-mode liquid crystal display because the film leads to reduced grayscale inversion, a reduced difference between a front image and an oblique image in grayscale reproducibility and color, high front contrast, and satisfactory front transmittance.

In this embodiment, the in-plane retardation Re is measured with reference to the direction along the fast axis of the first optically anisotropic layer.

The sum of the in-plane retardations Re of the first and second optically anisotropic layers is preferably in the range of −75 nm to 25 nm, more preferably −70 nm to 20 nm, more preferably −65 nm to 15 nm.

(Support)

An optical film of the invention may include a support supporting the first optically anisotropic layer and the second optically anisotropic layer. The support may be a temporary support which is to be removed before the use of the optical film of the invention.

The support may be of any material, such as glass or a polymer, preferably a polymer for an economic reason. The support preferably has a light transmittance of 80% or more. The support may cause retardation.

Examples of the usable support include: polycarbonate series polymers, polyester series polymers such as polyethylene terephthalate and polyethylene naphthalate, acryl series polymers such as polymethylmethacrylate, and styrene series polymers such as polystyrene and acryl nitrile/styrene copolymer (AS resin). Specific examples thereof include also polyolefins such as polyethylene and polypropylene, polyolefin series polymers such as ethylene/propylene copolymers, vinyl chloride series polymers, amide series polymers such as nylon and aromatic polyamide, imide series polymers, sulfone series polymers, polyether sulfone series polymers, polyether ether ketone series polymers, polyphenylene sulfide series polymers, vinylidene chloride series polymers, vinyl alcohol series polymers, vinyl butyral series polymers, arylate series polymers, polyoxymethylene series polymers, epoxy series polymers and any mixtures thereof. The polymer film of the present invention may be a hardened layer composed of an ultraviolet hardening resin such as acrylic, urethane, acrylic urethane, epoxy, or silicone resin or of a heat hardening resin.

As the material for forming the support, also preferred is use of thermoplastic norbornene resins. As the thermoplastic norbornene resins, there are mentioned Nippon Zeon's Zeonex and Zeonoa; JSR's Arton, etc.

The film is preferably made of cellulose polymer (hereinafter referred to as cellulose acylate), typically cellulose triacetate, which is a traditional material for transparent protective films in polarizing plates.

The support may be formed in any process, such as a solution-based or melt-based film formation process. The support may be a stretched film which is stretched for adjusting the retardation.

The support preferably has a thickness of 10 to 200 μm.

(Alignment Film)

An optical film of the invention preferably has an alignment film between a support and a first optically anisotropic layer so that liquid crystal compounds in the first optically anisotropic layer can be uniformly aligned. The alignment film may be first formed on a temporary support and then transferred to the support.

The alignment film is preferably a rubbed layer of a polymer. The polymer for the alignment film basically has a molecular structure that can align liquid crystal molecules. In addition, the polymer for the alignment film of the invention preferably has a side chain having a cross-linkable functional group (e.g., a double bond), in addition to the main chain, or has a cross-linkable functional group that can align liquid crystal molecules into a side chain. The polymer for the alignment film may be either a cross-linkable polymer or a polymer that can be cross-linked by a cross-linking agent, or a combination of these polymers. The polymer may be any of a methacrylate copolymer, a styrene copolymer, a polyolefin, a polyvinyl alcohol, a modified polyvinyl alcohol, poly(N-methylolacrylamide), a polyester, a polyimide, a vinyl acetate copolymer, carboxymethyl cellulose, and a polycarbonate, which are disclosed in paragraph [0022] of the specification of Japanese Unexamined Patent Application Publication No. H8-338913. The polymer may be a silane coupling agent. The polymer is preferably a water-soluble polymer (e.g., poly(N-methylolacrylamide), carboxymethylcellulose, gelatin, a polyvinyl alcohol, or a modified polyvinyl alcohol), more preferably gelatin, a polyvinyl alcohol, or a modified polyvinyl alcohol, more preferably a polyvinyl alcohol or a modified polyvinyl alcohol, more preferably a combination of two polyvinyl alcohols or modified polyvinyl alcohols having different degrees of polymerization. Examples of modified polyvinyl alcohol compounds include those disclosed in paragraphs [0022]-[0145] of the specification of Japanese Unexamined Patent Application Publication No. 2000-155216 and paragraphs [0018]-[0022] of the specification of Japanese Unexamined Patent Application Publication No. 2002-62426.

A cross-linking agent and any other additive may be optionally added to the alignment film. Examples of such a cross-linking agent include the compound disclosed in paragraphs [0023]-[0024] of the specification of Japanese Unexamined Patent Application Publication No. 2002-62426.

The alignment film preferably has a thickness of 0.05 μm to 1.5 μm.

An optical film of the invention is preferably used in a liquid crystal display, particularly as an optically-compensatory film in a transparent liquid crystal display, particularly as an optically-compensatory film that also serves as a protective film of a polarizing plate. In the present invention, the optical film is advantageously used in a birefringent liquid crystal display. The details will be described below.

<Polarizing Plate>

A polarizing plate of the invention includes a polarizing film and protective films on both surfaces of the polarizing film, at least one of the protective films being an optical film of the invention.

Figure 2:
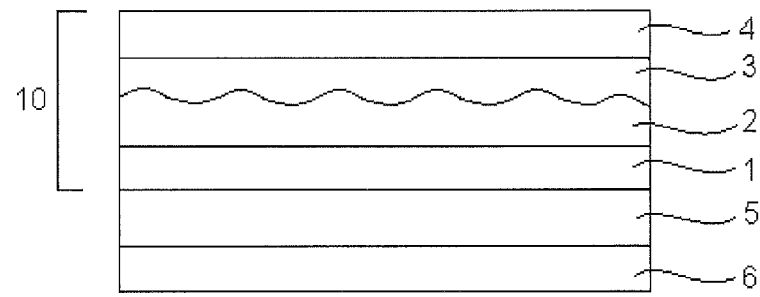
FIG. 2 is a schematic cross-sectional view illustrating an example polarizing plate of the invention.

Referring to FIG. 2, a polarizing plate of the invention includes a polarizing film 5, an optical film 10 of the invention laminated on one surface of the polarizing film 5, and a protective film 6 laminated on the other surface of the polarizing film 5. In this embodiment, the over side surface of the support 1 in the optical film 10 of the invention (the surface on which the first and second optically anisotropic layers are not disposed) is preferably bonded to one surface of the polarizing film 5.

The protective film bonded to the other surface of the polarizing film 5 may be any film which is preferably selected from the examples of the polymer film that can be used as a support in an optical film of the invention. Examples of preferred protective films include cellulose acylate films, such as cellulose triacetate films.

Examples of polarizing films include iodine polarizing films, dye polarizing films containing dichromatic dyes, and polyene polarizing films. The polarizing film of the present invention may be any of these films. Iodine polarizing films and dye polarizing films are usually formed of polyvinyl alcohol films.

A preferred method of manufacturing a polarizing plate of the invention includes a step of successively laminating an elongated optical film and an elongated polarizing film of the invention. The resulting polarizing plate is cut into the size of the screen of the liquid crystal display. The polarizing plate of the invention is preferably formed by continuous lamination of an elongated optical film and the elongated polarizing film of the invention.

The polarizing plate of the invention preferably has a thickness of 1 to 300 μm, more preferably 5 to 200 μm, more preferably 10 to 150 μm.

Figure 3:
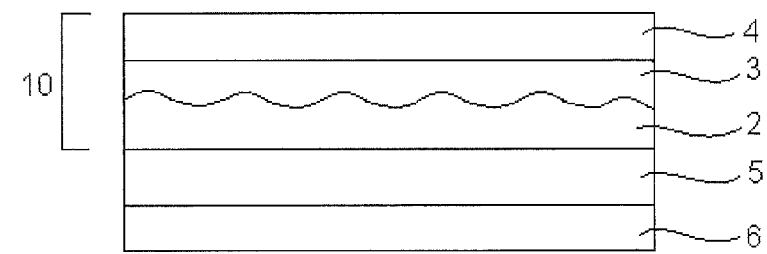
FIG. 3 is a schematic cross-sectional view illustrating an example polarizing plate of the invention.

As shown in FIG. 3, an example polarizing plate of the invention may include a polarizing film 5, an optical film 10 of the invention laminated on one surface of the polarizing film 5 without a support 1, and a protective film 6 laminated on the other surface of the polarizing film 5.

In this embodiment, a polarizing plate of the invention is fabricated by forming an alignment film on a temporary support, rubbing the alignment film, laminating first and second optically anisotropic layers on the alignment film, removing the temporary support, and bonding a polarizing film to the surface of the alignment film on which the first and second optically anisotropic layers are not disposed. Alternatively, the alignment film may be removed together with the temporary support and a polarizing film may be bonded to the surface of the first optically anisotropic layer on which the second optically anisotropic layer is not disposed.

The support for the optical film of the present invention may be a polarizing plate. In order to use the polarizing plate as a support, a protective film may be laminated on one surface of the polarizing film, and the optical film of the present invention may be laminated on the other surface of the polarizing film by direct coating and curing. The polarizing plate is thereby provided with the optical film.

In this embodiment, a process of fabricating a polarizing plate of the invention involves rubbing the polarizing film and laminating first and second retardation layers on the polarizing film. The process may involve laminating an alignment film on a surface of the polarizing film, rubbing the alignment film, and laminating the first and second retardation layers over the polarizing film.

In this embodiment, a polarizing plate of the invention preferably has a thickness of 1 to 250 μm, more preferably 5 to 150 μm, more preferably 10 to 100 μm.

<Liquid Crystal Display>

Figure 4:
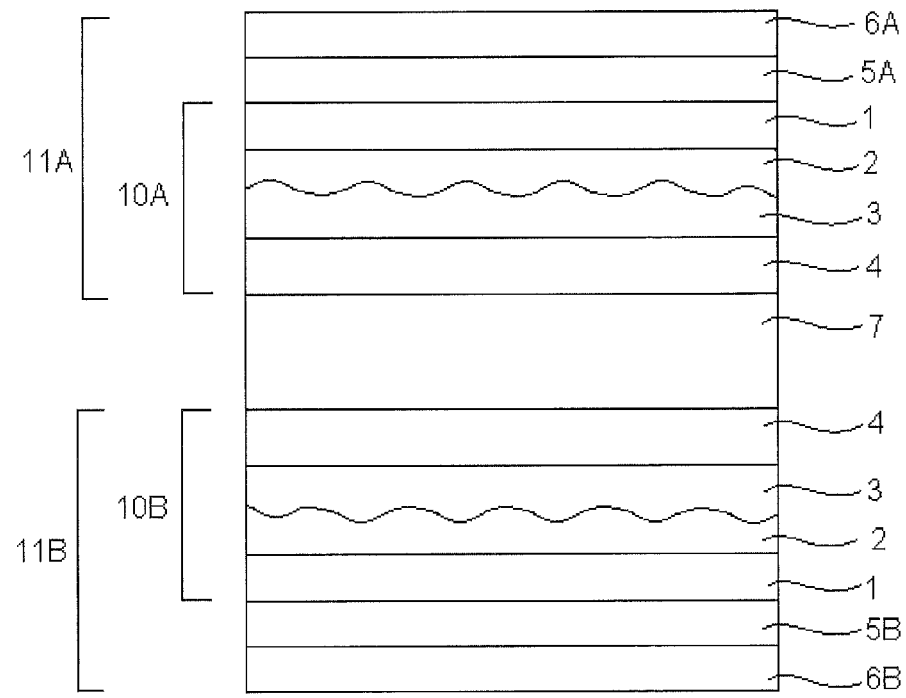
FIG. 4 is a schematic cross-sectional view illustrating an example liquid crystal display of the invention.
Figure 5:
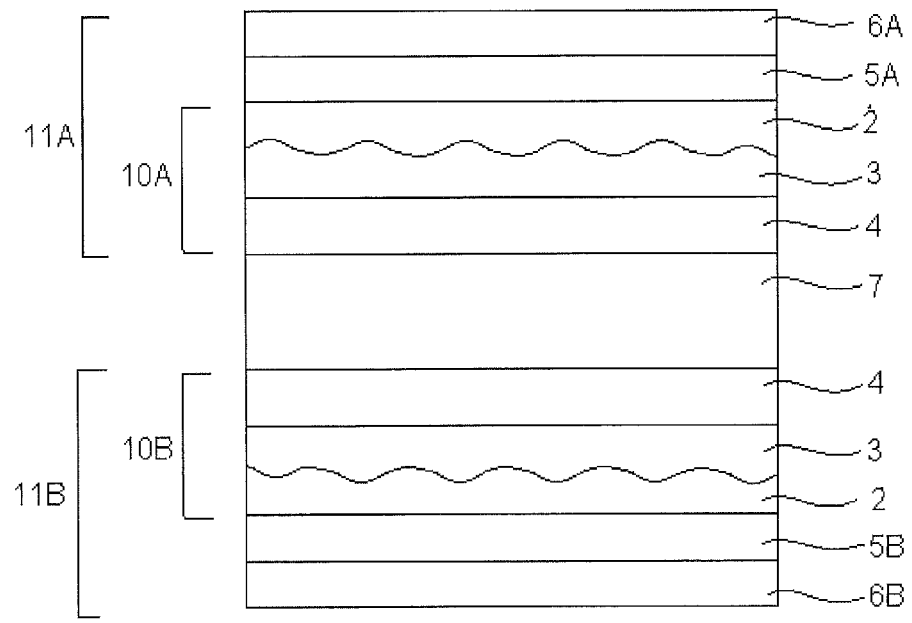
FIG. 5 is a schematic cross-sectional view illustrating an example liquid crystal display of the invention.

A liquid crystal display of the invention includes a pair of polarizing plates, a twisted nematic (TN) liquid crystal cell between the pair of polarizing plates, at least one of the polarizing plates being a polarizing plate of the invention, wherein the second optically anisotropic layer is near to the TN-mode liquid crystal cell. As shown in FIG. 4, an example liquid crystal display of the invention preferably has a pair of polarizing plates both being polarizing plates of the invention (11A and 11B). As shown in FIG. 5, another example liquid crystal display of the invention includes polarizing plates each having an optical film of the invention without a support.

The liquid crystal cell is a TN-mode liquid crystal cell the molecules of which are twisted at about 90° for alignment.

The liquid crystal cell includes a pair of substrates and a liquid crystal layer between the pair of substrates, the molecules being twisted at 900 for alignment, at least one of the substrates having an electrode of the pixel array on its surface. Twisting the molecules at 90° is preferable because it leads to high front contrast.

A liquid crystal display of the invention may be either a birefringent liquid crystal display or an optical rotation liquid crystal display.

A first embodiment of the birefringent liquid crystal display is illustrated in FIG. 4. Specifically, the birefringent liquid crystal display includes first and second polarizing films having absorption axes orthogonal to each other; first and second substrates facing each other between the first and second polarizing films, at least one of the first and second substrates having a transparent electrode; a TN-mode liquid crystal cell between the first and second substrates; a first optical film between a first polarizing film and the liquid crystal cell; and a second optical film between the second polarizing film and the liquid crystal cell. The first and second optical films each include a transparent support; an alignment film on the transparent support; a first optically anisotropic layer on the alignment film, the first optically anisotropic layer being a layer of a cured composition containing liquid crystal compounds; and a second optically anisotropic layer adjoining the first optically anisotropic layer, the second optically anisotropic layer being a layer of a cured composition containing liquid crystal compounds. The liquid crystal compound in the first optically anisotropic layer has a surface tilt angle of 5 to 80° at a side in contact with the second optically anisotropic layer.

The first and second optical films are disposed such that their second optically anisotropic layers are near to the liquid crystal cell. The absorption axis of the first polarizing film makes an angle of 45° with the director of the liquid crystal molecules at a site in contact with the surface of the first substrate of the liquid crystal cell adjacent to the first polarizing film.

Here, the optical film of the invention can be used as the first optical film or the second optical film, or both.

A second embodiment of the birefringent liquid crystal display is illustrated in FIG. 5. Specifically, the birefringent liquid crystal display includes first and second polarizing films having absorption axes orthogonal to each other; first and second substrates facing each other between the first and second polarizing films, at least one of the first and second substrates having a transparent electrode; a TN-mode liquid crystal cell between the first and second substrates; a first optical film between a first polarizing film and the liquid crystal cell; and a second optical film between the second polarizing film and the liquid crystal cell. The first and second optical films each includes an alignment film; a first optically anisotropic layer on the alignment film, the first optically anisotropic layer being a layer of a cured composition containing liquid crystal compounds; and a second optically anisotropic layer adjoining the first optically anisotropic layer, the second optically anisotropic layer being a layer of a cured composition containing liquid crystal compounds.

The molecules of the liquid crystal compound in the first optically anisotropic layer have a surface tilt angle of 5 to 80° at a site in contact with the second optically anisotropic layer. The first and second optical films are disposed such that their second optically anisotropic layers are near to the liquid crystal cell. The absorption axis of the first polarizing film makes an angle of 45° with the direction of the director of the liquid crystal molecules at a site in contact with the surface of the first substrate of the liquid crystal cell near to the first polarizing film.

Here, the optical film of the invention can be used as the first optical film or the second optical film, or both.

In these embodiments, the slow axes of the first and second optically anisotropic layers in the first optical film and the first and second optically anisotropic layers in the second optical film may make any angle, for example, an angle of 45 or 135° with or preferably be orthogonal or parallel to the direction of the director of the liquid crystal molecules at a site in contact with the surface of the near substrate of the liquid crystal cell.

In an example optical rotation liquid crystal display, the relation between the rubbing direction for the substrate of the liquid crystal cell and the absorption axis of the polarizing film is in the O mode (in which the rubbing direction for the substrate of the liquid crystal cell and the absorption axis of the polarizing film are parallel) or the E mode (in which the rubbing direction for the substrate of the liquid crystal cell and the absorption axis of the polarizing film are orthogonal).

A first embodiment of the optical rotation liquid crystal display is illustrated in FIG. 4. Specifically, the birefringent liquid crystal display includes first and second polarizing films having absorption axes orthogonal to each other; first and second substrates facing each other between the first and second polarizing films, at least one of the first and second substrates having a transparent electrode; a TN-mode liquid crystal cell between the first and second substrates; a first optical film between a first polarizing film and the liquid crystal cell; and a second optical film between the second polarizing film and the liquid crystal cell. The first and second optical films each include a transparent support; an alignment film on the transparent support; a first optically anisotropic layer on the alignment film, the first optically anisotropic layer being a layer of a cured composition containing liquid crystal compounds; and a second optically anisotropic layer adjoining the first optically anisotropic layer, the second optically anisotropic layer being a layer of a cured composition containing liquid crystal compounds. The liquid crystal compound in the first optically anisotropic layer has a surface tilt angle of 5 to 80° at a side in contact with the second optically anisotropic layer. The first and second optical films are disposed such that their second optically anisotropic layers are near to the liquid crystal cell. The absorption axis of the first polarizing film is orthogonal or parallel to the direction of the director of the liquid crystal molecules at a site in contact with the surface of the first substrate of the liquid crystal cell near to the first polarizing film.

Here, the optical film of the invention can be used as the first optical film or the second optical film, or both.

A second embodiment of the optical rotation liquid crystal display is illustrated in FIG. 5. Specifically, the birefringent liquid crystal display includes first and second polarizing films having absorption axes orthogonal to each other; first and second substrates facing each other between the first and second polarizing films, at least one of the first and second substrates having a transparent electrode; a TN-mode liquid crystal cell between the first and second substrates; a first optical film between a first polarizing film and the liquid crystal cell; and a second optical film between the second polarizing film and the liquid crystal cell. The first and second optical films each includes an alignment film; a first optically anisotropic layer on the alignment film, the first optically anisotropic layer being a layer of a cured composition containing liquid crystal compounds; and a second optically anisotropic layer adjoining the first optically anisotropic layer, the second optically anisotropic layer being a layer of a cured composition containing liquid crystal compounds. The molecules of the liquid crystal compound in the first optically anisotropic layer have a surface tilt angle of 5-80° at a site in contact with the second optically anisotropic layer. The first and second optical films are disposed such that their second optically anisotropic layers are near to the liquid crystal cell. The absorption axis of the first polarizing film is orthogonal or parallel to the direction of the director of the liquid crystal molecules at a site in contact with the surface of the first substrate of the liquid crystal cell near to the first polarizing film.

Here, the optical film of the invention can be used as the first optical film or the second optical film, or both.

In these embodiments, the slow axes of the first and second optically anisotropic layers in the first optical film and the first and second optically anisotropic layers in the second optical film may make any angle, for example, an angle of 45 or 135° with or preferably be orthogonal or parallel to the direction of the director of the liquid crystal molecules at a site in contact with the surface of the near substrate of the liquid crystal cell.

In the first and second embodiments of the birefringent liquid crystal display and the first and second embodiments of the optical rotation liquid crystal display, it is preferred that the first optically anisotropic layer of the first and second optical films be composed of a layer of a cured composition containing a rod-like liquid crystal compound and the second optically anisotropic layer of the first and second optical films be composed of a layer of a cured composition containing a discotic liquid crystal.

Alternatively, in the first and second embodiments of the birefringent liquid crystal display and the first and second embodiments of the optical rotation liquid crystal display, it is preferred that the first optically anisotropic layer of the first and second optical films be composed of a layer of a cured composition containing a discotic liquid crystal compound, and the second optically anisotropic layer of the first and second optical films be composed of a layer of a cured composition containing a rod-like liquid crystal.

In common TN liquid crystal displays, $\Delta n \cdot d$, which represents the product of the thickness d and birefringence index $\Delta n$ of the liquid crystal layer, is in the range of about 300 nm to 600 nm. In the present invention, $\Delta n \cdot d$ is preferably in the range of 380 nm to 480 nm.

The details of TN liquid crystal displays are disclosed in the specifications of Japanese Unexamined Patent Application Publication No. H6-214116, U.S. Pat. Nos. 5,583,679 and 5,646,703, and German Patent No. 3911620-A1. Optically-compensatory sheets for IPS or FLC liquid crystal cells are described in Japanese Unexamined Patent Application Publication No. H10-54982, the contents of which are incorporated in this specification.

The liquid crystal display is in a normally white mode in which the pair of polarizing films has absorption axes substantially orthogonal to each other.

In the optical film 10A illustrated in FIGS. 4 and 5, the slow axes of the first and second optically anisotropic layers are preferably orthogonal or parallel to the direction of the director of the liquid crystal molecules at a site in contact with the surface of a substrate of the liquid crystal cell, the substrate adjoining the polarizing plate 11A. Similarly, in the optical film 10B, the slow axes of the first and second optically anisotropic layers are preferably orthogonal or parallel to the direction of the director of the liquid crystal molecules at a site in contact with the surface of a substrate of the liquid crystal cell, the substrate adjoining the polarizing plate 11B.

In the optical film 10A illustrated in FIGS. 4 and 5, the slow axes of the first and second optically anisotropic layers are preferably orthogonal or parallel to or preferably make an angle of 45° or 135° with the absorption axis of the polarizing film in the polarizing plate 11A. Similarly, in the optical film 10B, the slow axes of the first and second optically anisotropic layers are preferably orthogonal or parallel to or preferably make an angle of 45° or 135° with the absorption axis of the polarizing film in the polarizing plate 11B. In an optical rotation liquid crystal display, such slow axes are preferably orthogonal or parallel to the absorption axis. In a birefringent liquid crystal display, such slow axes preferably make an angle of 45° or 135° with the absorption axis.

For the optical film of the invention used in the birefringent liquid crystal display, the sum of the in-plane retardations Re of the first and second optically anisotropic layers is preferably in the range of −75 nm to 25 nm.

In other words, for the pair of polarizing plates, the sum of the in-plane retardations Re of the first and second optically anisotropic layers is in the range of −75 nm to 25 nm, preferably −65 nm to 15 nm, more preferably −55 nm to 5 nm. The in-plane retardation Re has a negative or positive sign. The negative sign corresponds to the direction of the director of the liquid crystal molecules at a site in contact with the surface of the near substrate of the liquid crystal cell. The positive sign corresponds to the direction orthogonal to the direction of the director of the liquid crystal molecules. A birefringent liquid crystal display with such a structure exhibits high light transmittance because the sum of the in-plane retardations Re for each film is such a value that the slow axes of the first and second optically anisotropic layers are parallel to the direction of the director of the liquid crystal molecules at a site in contact with the surface of the near substrate. Moreover, such a birefringent liquid crystal display has a hybrid alignment mainly in the second optically anisotropic layer, cancelling the retardation and thus reducing the leakage of oblique light in the liquid crystal panel in the black display mode. Hence, such a birefringent liquid crystal display has satisfactory display performance.

In this description, $Re(\lambda)$ and $Rth(\lambda)$ are retardation (nm) in plane and retardation (nm) along the thickness direction, respectively, at a wavelength of $\lambda$. $Re(\lambda)$ is measured by applying light having a wavelength of $\lambda$ nm to a film in the normal direction of the film, using KOBRA 21ADH or WR (by Oji Scientific Instruments). The selection of the measurement wavelength may be conducted according to the manual-exchange of the wavelength-selective-filter or according to the exchange of the measurement value by the program.

When a film to be analyzed is expressed by a monoaxial or biaxial index ellipsoid, $Rth(\lambda)$ of the film is calculated as follows.

$Rth(\lambda)$ is calculated by KOBRA 21ADH or WR on the basis of the six $Re(\lambda)$ values which are measured for incoming light of a wavelength $\lambda$ nm in six directions which are decided by a 100 step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane), a value of hypothetical mean refractive index, and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the $Rth(\lambda)$ of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (1) and (2):

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (1)$$

$$Rth = \left\{\frac{(nx+ny)}{2} - nz\right\} \times d \quad (2)$$

Re(θ) represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then Rth(λ) of the film may be calculated as follows:

Re(λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of λ nm applied in the inclined direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main optical films are listed below:

cellulose acylate (1.48), cycloolefin polymer (1.52), polycarbonate (1.59), polymethylmethacrylate (1.49) and polystyrene (1.59). KOBRA 21ADH or WR calculates nx, ny and nz, upon enter of the hypothetical values of these mean refractive indices and the film thickness. On the basis of thus-calculated nx, ny and nz, Nz=(nx−nz)/(nx−ny) is further calculated.

In this specification, the wavelength at which the refraction index is measured is 550 nm unless otherwise specified. A "slow axis" indicates a direction that provides the maximum refraction index.

In this specification, "parallel", "orthogonal", "0°", "90°", "45°", and other simple specific expressions to describe the arrangement of axes and directions or an crossing angle do not always indicate exact values and mean "generally parallel", "generally orthogonal", "approximately 0°", "approximately 90°", and "approximately 45°", respectively. A certain amount of margin is acceptable for the accomplishment of the objectives. For instance, "parallel" and "0°" each indicate that the crossing angle is approximately 0°, in the range of −10° to 10°, preferably −5° to 5°, more preferably −3° to 3°. The expressions "orthogonal" and "90°" each indicate that the crossing angle is approximately 90°, in the range of 80 0 to 100°, preferably 85° to 95°, more preferably 87° to 93°. The expression "45°" indicates that the crossing angle is approximately 45°, in the range of 35° to 55°, preferably 40° to 50°, more preferably 42° to 48°

EXAMPLES

Paragraphs below will further specifically describe features of the present invention, referring to Examples and Comparative Examples.

Any materials, amount of use, ratio, details of processing, procedures of processing and so forth shown in Examples may appropriately be modified without departing from the spirit of the present invention. Therefore, it is to be understood that the scope of the present invention should not be interpreted in a limited manner based on the specific examples shown below.

1. Fabrication of Optical Films
(1) Details on Optical Films

Table 1 shows the specifications of the fabricated optical films.

Table 2 lists the supports for the optical films, Table 3 lists the alignment films for the optical films and their formation conditions, and Table 4 lists the first and second optically anisotropic layers for the optical films and the coating solution compositions and formation conditions for the plates.

The fabrication of each optical film includes forming an alignment layer on a support, rubbing the alignment layer in the rubbing direction shown in Table 1, and coating the alignment layer with a coating solution, aligning, and maturing the coating solution, and then irradiating the coating solution with UV rays for curing by polymerization.

A first optically anisotropic layer is formed on the workpiece according to the conditions and layer structure shown in Table 1.

In particular, for an optical film 1, the support 1 in Table 2 is coated with the coating solution for the alignment film A in Table 3 using a bar #8. The workpiece is heated at a temperature of 100° C. for two minutes to form an alignment film. The alignment film is then rubbed in the longitudinal direction of the support and coated with a coating solution 1 in Table 4 using a bar #3. The workpiece is heated at a temperature of 100° C. for 30 seconds for alignment and aging, and then irradiated with UV rays at 60° C. under nitrogen atmosphere with an irradiation energy of 500 mJ/cm² for polymerization to form a first optically anisotropic layer.

The workpiece is coated with the coating solution for the alignment film A using the bar #8, and then heated at a temperature of 100° C. for two minutes to form an alignment film. The alignment film is then rubbed in the longitudinal direction of the support and coated with a coating solution 4 in Table 4 using a bar #4. The workpiece is heated at a temperature of 125° C. for two minutes for alignment and aging, and then irradiated with UV rays at 90° C. under nitrogen atmosphere with an irradiation energy of 500 mJ/cm$^2$ for polymerization to form a second optically anisotropic layer. Thus, an optical film 1 is fabricated.

Optical films 2 to 206 were formed in a similar manner under the respective formation conditions in Tables 1 to 4. For each of the optical films 4 to 10 in Table 1, two optical films were fabricated. One was formed under the condition that the rubbing direction for the first optically anisotropic layer was 45° clockwise from the longitudinal direction of the support; and the other, 45° counterclockwise from the longitudinal direction of the support.

TABLE 1

| | | Optical film 1 | Optical film 2 | Optical film 3 | Optical film 4 | Optical film 5 | Optical film 6 | Optical film 7 | Optical film 8 | Optical film 9 |
|---|---|---|---|---|---|---|---|---|---|---|
| Layer structure | Second optically anisotropic layer | Discotic liquid crystal | Discotic liquid crystal | Discotic liquid crystal | Discotic liquid crystal | Discotic liquid crystal | Discotic liquid crystal | Rod-like liquid crystal | Discotic liquid crystal | Rod-like liquid crystal |
| | First optically anisotropic layer | Rod-like liquid crystal | Rod-like liquid crystal | Rod-like liquid crystal | Rod-like liquid crystal | Rod-like liquid crystal | Rod-like liquid crystal | Discotic liquid crystal | Rod-like liquid crystal | Discotic liquid crystal |
| Second optically anisotropic layer | Coating solution | Coating solution 4 | Coating solution 4 | Coating solution 4 | Coating solution 5 | Coating solution 5 | Coating solution 5 | Coating solution 2 | Coating solution 5 | Coating solution 2 |
| | Rubbing treatment | Run | Run | Unadministered | Run | Run | Unadministered | Unadministered | Unadministered | Unadministered |
| | Rubbing direction (Angle for longitudinal direction of the support) | Parallel | Parallel | — | Direction making an angle of 45° | Direction making an angle of 45° | — | — | — | — |
| | Re (nm) | −30 | −30 | −30 | 25 | 25 | 25 | −35 | 25 | −35 |
| | Alignment layer | Alignment layer A | Non-existance | Non-existance | Alignment layer A | Non-existance | Non-existance | Non-existance | Non-existance | Non-existance |
| First optically anisotropic layer | Coating solution | Coating solution 1 | Coating solution 1 | Coating solution 1 | Coating solution 1 | Coating solution 1 | Coating solution 1 | Coating solution 3 | Coating solution 1 | Coating solution 3 |
| | Rubbing treatment | Run | Run | Run | Run | Run | Run | Run | Run | Run |
| | Rubbing direction (Angle for longitudinal direction of the support) | Parallel | Parallel | Parallel | Direction making an angle of 45° | Direction making an angle of 45° | Direction making an angle of 45° | Direction making an angle of 45° | Direction making an angle of 45° | Direction making an angle of 45° |
| | Re (nm) | −50 | −50 | −50 | −50 | −50 | −50 | 10 | −50 | 10 |
| | Tilt angle of the second optically anisotropic layer | 5 | 5 | 5 | 5 | 5 | 5 | 30 | 7 | 30 |
| | Alignment layer | Alignment layer A | Alignment layer A | Alignment layer A | Alignment layer A | Alignment layer A | Alignment layer A | Alignment layer A | Alignment layer B | Alignment layer B |
| Support | | Support 1 | Support 1 | Support 1 | Support 2 | Support 2 | Support 2 | Support 3 | Support 4 | Support 5 |

| | | Optical film 10 | Optical film 201 | Optical film 202 | Optical film 203 | Optical film 204 | Optical film 205 | Optical film 206 |
|---|---|---|---|---|---|---|---|---|
| Layer structure | Second optically anisotropic layer | Discotic liquid crystal | Rod-like liquid crystal | Rod-like liquid crystal | Discotic liquid crystal | Discotic liquid crystal | Discotic liquid crystal | Discotic liquid crystal |
| | First optically anisotropic layer | Rod-like liquid crystal | Discotic liquid crystal | Discotic liquid crystal | Rod-like liquid crystal | Rod-like liquid crystal | Rod-like liquid crystal | Rod-like liquid crystal |
| Second optically anisotropic layer | Coating solution | Coating solution 5 | Coating solution 2 | Coating solution 2 | Coating solution 5 | Coating solution 5 | Coating solution 5 | Coating solution 19 |
| | Rubbing treatment | Unadministered | Run | Run | Unadministered | Unadministered | Unadministered | Unadministered |
| | Rubbing direction (Angle for longitudinal direction of the support) | — | Direction making an angle of 45° | Direction making an angle of 45° | — | — | — | — |
| | Re (nm) | 25 | −35 | −35 | 25 | 25 | 25 | 40 |
| | Alignment layer | Non-existance | Alignment layer A | Non-existance | Non-existance | Non-existance | Non-existance | Non-existance |
| First optically anisotropic layer | Coating solution | Coating solution 1 | Coating solution 3 | Coating solution 3 | Coating solution 16 | Coating solution 17 | Coating solution 18 | Coating solution 17 |
| | Rubbing treatment | Run | Run | Run | Run | Run | Run | Run |
| | Rubbing direction (Angle for longitudinal direction of the support) | Direction making an angle of 45° | Direction making an angle of 45° | Direction making an angle of 45° | Direction making an angle of 45° | Direction making an angle of 45° | Direction making an angle of 45° | Direction making an angle of 45° |

TABLE 1-continued

|  |  |  |  |  |  |  |  |  |
|---|---|---|---|---|---|---|---|---|
|  | Re (nm) | −50 | 10 | 10 | −95 | −5 | −105 | −5 |
|  | Tilt angle of the second optically anisotropic layer | 5 | 30 | 30 | 5 | 5 | 5 | 5 |
|  | Alignment layer | Alignment layer A Non-existance | Alignment layer A Support 3 | Alignment layer A Support 3 | Alignment layer A Support 2 | Alignment layer A Support 2 | Alignment layer A Support 2 | Alignment layer A Support 2 |
| Support |  |  |  |  |  |  |  |  |

TABLE 2

| Variation of support | Support 1 | Support 2 | Support 3 | Support 4 | Support 5 |
|---|---|---|---|---|---|
|  | Cellulose acylate | | | Cycloolefin polymer | |
| Re[nm] | −7 | 0 | −5 | 0 | −5 |
| Rth[nm] | 90 | 0 | 40 | 0 | 40 |
| Thickness/μm | 80 | 40 | 40 | 40 | 40 |

*In the table, Re has a negative sign in the longitudinal direction of the film.

Specifically, the method of fabricating the support 1 was based on paragraphs [0089]-[0091] of Japanese Unexamined Patent Application Publication No. 2009-237421. The support 2 was fabricated according to paragraphs [0068]-[0071] of Japanese Unexamined Patent Application Publication No. 2007-536561. The support 3 was commercially available FUJITAC T40UZ. The supports 4 and 5 were fabricated according to paragraphs [0141]-[0151] of Japanese Unexamined Patent Application Publication No. 2008-274135.

TABLE 3

|  | Alignment film A | Alignment film B |
|---|---|---|
| Material of alignment film | Compound 1 | SUNEVER 130 (Nissan Chemical Industries, LTD) |
| Solvent | Water/MeOH (70 Parts by mass/ 30 Parts by mass) | n-methylpyrrolidone |
| Solid content | 4 Mass % | 2 Mass % |
| Number of bar | #8 | #4 |
| Annealed temperature | 100° C. | 200° C. |
| Annealed time | 2 Minute | 30 Minute |
| Thickness | 0.6 μm | 0.1 μm |

Specifically, the method of fabricating the alignment film A was based on paragraphs [0105]-[0109] of Japanese Unexamined Patent Application Publication No. 2012-208397. The alignment film B was formed according to paragraph [0143] of Japanese Unexamined Patent Application Publication No. 2006-267723.

TABLE 4

|  |  | Coating solution 1 | Coating solution 2 | Coating solution 3 | Coating solution 4 | Coating solution 5 | Coating solution 19 | Coating solution 16 | Coating solution 17 | Coating solution 18 |
|---|---|---|---|---|---|---|---|---|---|---|
| Formulation of the coating solution | Crystal liquid compound | Compound 2 (100 Parts by mass) | | Compound 3 (90 Parts by mass) | | | | Compound 2 (100 Parts by mass) | | |
|  | Initiator | | | Irgacure 907 BASF Co., Ltd | | | | | | |
|  | Sensitizer | | | Kayacure DETX Nippon Kayaku Co., Ltd (1 Parts by mass) | | | | | | |
|  | Monomer | Non-existance | | Ethylene oxide-modified trimethylolpropane triacrylate (V#360 from Osaka Organic Chemical Industry Ltd) (10 Parts by mass) | | | | Non-existance | | |
|  | Air interface rubbing agent | Compound 4 (1.5 Parts by mass) | | Compound 5 (0.8 Parts by mass) | Non-existance | Compound 5 (0.6 Parts by mass) | Non-existance | Compound 4 (0.8 Parts by mass) | Compound 4 (5 Parts by mass) | Compound 4 (0.7 Parts by mass) |
| Formation conditions for the optically anisotropic layer | Solvent | | | Methylethylketone | | | | | | |
|  | Solid content | 9 Mass % | 6.2 Mass % | 21 Mass % | 24 Mass % | 32 Mass % | 24 Mass % | 17 Mass % | 9 Mass % | 19 Mass % |
|  | Number of bar | #3 | | #4 | | #5 | #4 | | #3 | |
|  | Aligned temperature | 100° C. | | 125° C. | | | | 100° C. | | |
|  | Aligned time | 30 second | | 2 minute | | | | 30 second | | |
|  | Polymerization temperature | 60° C. | | 90° C. | | | | 60° C. | | |
|  | Irradiation energy | | | 500 mJ/cm² | | | | | | |
|  | Existance or non-existance of $N_2$ | | | Existance | | | | | | |

Compound 1

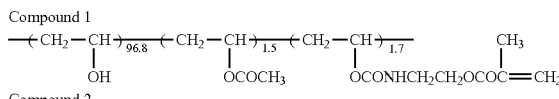

Compound 2

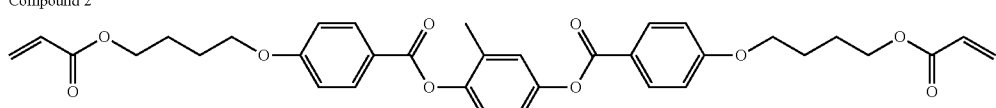

TABLE 4-continued

|  | Coating solution 1 | Coating solution 2 | Coating solution 3 | Coating solution 4 | Coating solution 5 | Coating solution 19 | Coating solution 16 | Coating solution 17 | Coating solution 18 |
| --- | --- | --- | --- | --- | --- | --- | --- | --- | --- |

Compound 3

Compound 4

Compound 5

(4) Evaluation of Optical Film (4)-1 Evaluation of Alignment

The properties of the fabricated optical films are shown in the table below. Here, the front in-plane retardation Re (the sum of the in-plane retardations Re of the first and second optically anisotropic layers) was measured for the samples of the above-described optical films which had glass substrates as the transparent supports, using KOBRA-21ADH (Oji Scientific Instruments) at a wavelength of 550 nm.

The arrangement of the slow axes was determined by comparing the front in-plane retardations Re measured for first and second optically anisotropic layers each formed on a glass substrate, using KOBRA-21ADH (Oji Scientific Instruments) at a wavelength of 550 nm, with the in-plane retardation Re measured for a sample having first and second optically anisotropic layers laminated on a glass substrate, in the same conditions. Slow axes arranged such that the in-plane retardation Re of the lamination sample equals the sum of the in-plane retardations Re of the first and second optically anisotropic layers are "parallel". Slow axes arranged such that Re of the lamination sample equals a difference between the in-plane retardations Re of the first and second optically anisotropic layers are "orthogonal".

With the slow axes being "orthogonal", Re of the rod-like liquid crystal layer, which is larger than that of the disk-like liquid crystal, had a positive sign in the direction of the director of the liquid crystal molecules at a site in contact with the surface of the near substrate of the liquid crystal cell.

<Repelling>

Repelling occurs in the form of small circular portions visible on a film placed on a schaukasten, the film being composed of an optical film and two polarizing plates on both surfaces of the optical film, the optical film being in a diagonal position, the polarizing plates being in a crossed nicol state. The circular portions differ from the surrounding portions in brightness. The optical films were each ranked as A when having two or less such portions per square meter, B when having 3-10 such portions per square meter, and C when having 11 or more such portions per square meter.

<Bright Dots>

Bright dots are white dots visible on a film placed on a schaukasten, the film being composed of an optical film and two polarizing plates on both surfaces of the optical film, the optical film being in an extinction position, the polarizing plates being in a crossed nicol state. The optical film were each ranked as A when having 15 or less bright dots per square meter, B when having 16-50 bright dots per square meter, and C when having 51 or more bright dots per square meter.

<Broad Irregularity>

A broad irregularity is a large-cycle pale undulation visible on a film placed on a schaukasten, the film being composed of an optical film and two polarizing plates on both surfaces of the optical film, the optical film being in an extinction position, the polarizing plates being in a crossed nicol state. The optical films were each ranked as A when having no broad irregularity, and B when having at least one broad irregularity.

TABLE 5

|  |  | Optical film 1 | Optical film 2 | Optical film 3 | Optical film 4 | Optical film 5 | Optical film 6 | Optical film 7 | Optical film 8 | Optical film 9 |
|---|---|---|---|---|---|---|---|---|---|---|
| Evaluation of film | Sum of Re[nm] | 80 | 80 | 80 | −25 | −25 | −25 | −25 | −25 | −25 |
|  | Slow axes arrangment | Parallel | Parallel | Parallel | Orthogonal | Orthogonal | Orthogonal | Orthogonal | Orthogonal | Orthogonal |
|  | Repelling | C | A | A | C | A | A | A | A | A |
|  | Bright dots | C | C | A | C | C | A | A | A | A |
|  | Broad irregularity | B | B | A | B | B | A | A | A | A |
|  | Thickness of optical film(μm) | 84.1 | 83.5 | 83.5 | 43.7 | 43.1 | 43.1 | 43.6 | 42.6 | 43.1 |

|  |  | Optical film 10 | Optical film 201 | Optical film 202 | Optical film 203 | Optical film 204 | Optical film 205 | Optical film 206 |
|---|---|---|---|---|---|---|---|---|
| Evaluation of film | Sum of Re[nm] | −25 | −25 | −25 | −70 | 20 | −80 | 35 |
|  | Slow axes arrangment | Orthogonal | Orthogonal | Orthogonal | Orthogonal | Orthogonal | Orthogonal | Orthogonal |
|  | Repelling | A | B | A | A | A | A | A |
|  | Bright dots | A | C | C | A | A | A | A |
|  | Broad irregularity | A | B | C | A | A | A | A |
|  | Thickness of optical film(μm) | 3.1 | 44.2 | 43.6 | 43.4 | 42.7 | 43.5 | 44.0 |

*The slow axes arrangement refers to the relation between the slow axes of the first and second optically anisotropic layers.

The table shows that the optical films 3 and 6 to 10 have reduced repelling portions, bright dots, and broad irregularities. The table also shows that the optical film 10 is thinner than the other optical films because the optical film 10 is formed by forming an alignment film, a first optically anisotropic layer, and a second optically anisotropic layer on a temporary support and then removing the temporary support for transfer.

Figure 6:
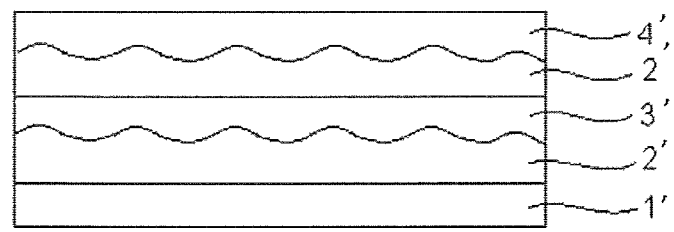
FIG. 6 is a schematic cross-sectional view illustrating an example conventional optical film.

The optical films 1 and 4 with the structure in FIG. 6 have an alignment film on a second optically anisotropic layer, and a first optically anisotropic layer on the alignment film. The optical films 1 and 4, which have two alignment films, are thick and have many repelling portions, bright dots, and broad irregularities as shown in the table.

Figure 7:
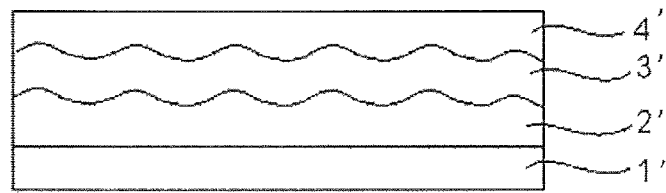
FIG. 7 is a schematic cross-sectional view illustrating an example optical film.

The optical films 2 and 5 with the structure in FIG. 7 have a rubbed first optically anisotropic layer and a second optically anisotropic layer on a first optically anisotropic layer. The optical films 2 and 5, which have a rubbed first optically anisotropic layer, have residual debris and thus have many repelling portions, bright dots, and broad irregularities as shown in the table.

2. Fabrication and Evaluation of Liquid Crystal Display
(1) Fabrication of Polarizing Plate A polyvinyl alcohol (PVA) film having a thickness of 80 μm was soaked in an aqueous 0.05 mass % iodine solution at 30° C. for 60 seconds for staining, then soaked in an aqueous 4 mass % boric acid solution for 60 seconds to longitudinally stretch the film to five times the original length, and then dried at 50° C. for four minutes to yield a polarizing film having a thickness of 20 μm.

A commercially available cellulose acetate film was soaked in an aqueous 1.5 mol/L sodium hydroxide solution at 55° C. Sodium hydroxide was then washed off with water. The workpiece was soaked in an aqueous 0.005 mol/L dilute sulfuric acid solution at 35° C. for one minute. Sulfuric acid was then washed off with water. Finally, the workpiece was sufficiently dried at 120° C.

The polarizing film was bonded between the optical film fabricated in the above-described manner and the saponified commercially available cellulose acetate film with a polyvinyl alcohol adhesive to form a polarizing plate. The optically anisotropic layer of the optical film was disposed on the outer side. The commercially available cellulose acetate film was FUJITAC TF80UL (FUJIFILM Corporation). The polarizing film and protective films on both surfaces of the polarizing film, which are rolled films and thus have longitudinal directions parallel to one another, are bonded by continuous lamination. Thus, the longitudinal direction of the rolled optical film (the stretching direction of the cellulose acetate film) was parallel to the absorption axis of the polarizing film.

(2) Fabrication of TN Liquid Crystal Display

The TN liquid crystal displays listed in the table below were each prepared with a liquid crystal display including a TN-mode liquid crystal cell (S23B350H, made by Samsung Electronics Co., Ltd) from which a pair of polarizing plates was removed. Two polarizing plates formed in the above process were respectively bonded on the viewer side and the backlight side of the liquid crystal display with an adhesive. Polarizing plates formed in the manner described in (1) were bonded such that the liquid crystal displays of Comparative examples 1 and 2 and Example 1 were of the optical rotation mode, and the liquid crystal displays of the other examples and comparative examples were of the birefringent mode. The angles of the absorption axes of the bonded polarizing plates are as shown in the table.

(3) Evaluation of TN Liquid Crystal Display
<Front Contrast Ratio (CR)>

For the liquid crystal displays fabricated in the above-described manner, the brightness (Yw) in the front direction (in the normal direction of the screen) generated by a white display and the brightness (Yw) in the front direction generated by a black display were measured by a measuring device "EZ-Contrast XL88" (made by ELDIM) to calculate the front contrast ratio (Yw/Yb). The liquid crystal displays were then evaluated based on the following standards.
4: 1000≤front CR
3: 750≤front CR<1000
2: 500≤front CR<750
1: front CR<500

<Grayscale Inversion Observed from Below>

A standard image (ISO 12640-1:1997, standard number: JIS X 9201:1995, and image name: portrait) was displayed on the liquid crystal displays fabricated in the above-described manner, and was visually observed from below (a polar angle of 300) in a darkroom to evaluate the grayscale inversion in the displayed image.

5: no grayscale inversion was observed from below.
4: almost no grayscale inversion was observed from below.
3: slight grayscale inversion was observed from below.
2: grayscale inversion was observed from below.
1: significant grayscale inversion was observed from below.

<Actual Image Evaluation: Difference Between Front Image and Oblique Image in Grayscale Reproducibility and Color>

A standard image (ISO 12640-1:1997, standard number: JIS X 9201:1995, and image name: portrait) was displayed on the liquid crystal displays fabricated in the above-described manner, and was visually observed from front and an oblique direction (a polar angle of 45°, a given azimuth angle) in a darkroom to evaluate the symmetricity in the displayed image.

5: almost no difference was observed between the front image and the oblique image in grayscale reproducibility and color from any azimuth angle.
4: a very small difference was observed between the front image and the oblique image in grayscale reproducibility and color from any azimuth angle
3: a small difference was observed between the front image and the oblique image in grayscale reproducibility and color from any azimuth angle.
2: a difference was observed between the front image and the oblique image in grayscale reproducibility and color from a particular azimuth angle.
1: a significant difference was observed between the front image and the oblique image in grayscale reproducibility and color from a particular azimuth angle.

<Front Transmittance>

For the liquid crystal displays fabricated in the above-described manner, the brightness (Y) in the front direction (in the normal direction of the screen) produced by a white display was measured by a measuring device "EZ-Contrast XL88" (made by ELDIM). The brightness (Y0) was then measured for each liquid crystal display from which the liquid crystal panel was removed and which had only a backlight. Each liquid crystal display was evaluated in the ratio of the brightness (Y) to the brightness (Y0) based on the following standards.

5: 5.0%≤Y/Y0
4: 4.0%≤Y/Y0<5.0%
3: 3.0%≤Y/Y0<4.0%
2: 2.0%≤Y/Y0<3.0%
1: 1.0%≤Y/Y0<2.0%

TABLE 6

|  |  | Comparative example 1 | Comparative example 2 | Example 1 | Comparative example 3 | Comparative example 4 | Example 2 | Example 3 | Example 4 |
|---|---|---|---|---|---|---|---|---|---|
| Polarizing film(5A) | Absorption axis [°] | 45 | 45 | 45 | 0 | 0 | 0 | 0 | 0 |
| Optical film (10A) | Film | Optical film 1 | Optical film 2 | Optical film 3 | Optical film 4 | Optical film 5 | Optical film 6 | Optical film 7 | Optical film 8 |
| Second optically anisotropic layer | Direction of slow axis [°] | 135 | 135 | 135 | 90 | 90 | 90 | 0 | 90 |
| First optically anisotropic layer | Direction of slow axis [°] | 135 | 135 | 135 | 0 | 0 | 0 | 90 | 0 |
| Sum of Re of optically anisotropic layer[nm] |  | −80 | −80 | −80 | −25 | −25 | −25 | −25 | −25 |
| Support | Direction of slow axis [°] | 45 | 45 | 45 | — | — | — | 0 | — |
| Liquid crystal cell | Direction of rubbing [°] (A site in contact with the pllarizing film 1A) | 45 | 45 | 45 | 45 | 45 | 45 | 45 | 45 |
| Optical film (10B) | Film | Optical film 1 | Optical film 2 | Optical film 3 | Optical film 4 | Optical film 5 | Optical film 6 | Optical film 7 | Optical film 8 |
| Second optically anisotropic layer | Direction of slow axis [°] | 45 | 45 | 45 | 0 | 0 | 0 | 90 | 0 |
| First optically anisotropic layer | Direction of slow axis [°] | 45 | 45 | 45 | 90 | 90 | 90 | 0 | 90 |
| Sum of Re of optically anisotropic layer[nm] |  | −80 | −80 | −80 | −25 | −25 | −25 | −25 | −25 |
| Support | Direction of slow axis [°] | 135 | 135 | 135 | — | — | — | 90 | — |
| Polarizing film (5B) | Absorption axis [°] | 135 | 135 | 135 | 90 | 90 | 90 | 90 | 90 |
| Display performance | Front CR | 1 | 1 | 4 | 1 | 1 | 4 | 4 | 4 |
|  | Grayscale inversion | 2 | 2 | 2 | 3 | 3 | 3 | 3 | 3 |
|  | Actual image evaluation | 2 | 2 | 2 | 4 | 4 | 4 | 3 | 4 |
|  | Front transmittance | 5 | 5 | 5 | 5 | 5 | 5 | 5 | 5 |

|  |  | Example 5 | Example 6 | Comparative example 5 | Comparative example 6 | Example 7 | Example 8 | Example 9 | Example 10 |
|---|---|---|---|---|---|---|---|---|---|
| Polarizing film(5A) | Absorption axis [°] | 0 | 0 | 0 | 0 | 0 | 0 | 0 | 0 |
| Optical film (10A) | Film | Optical film 9 | Optical film 10 | Optical film 201 | Optical film 202 | Optical film 203 | Optical film 204 | Optical film 205 | Optical film 206 |
| Second optically anisotropic layer | Direction of slow axis [°] | 0 | 90 | 0 | 0 | 90 | 90 | 90 | 90 |
| First optically anisotropic layer | Direction of slow axis [°] | 90 | 0 | 90 | 90 | 0 | 0 | 0 | 0 |
| Sum of Re of optically anisotropic layer[nm] |  | −25 | −25 | −25 | −25 | −70 | 20 | −80 | 35 |

TABLE 6-continued

| Support | Direction of slow axis [°] | 0 | — | 0 | 0 | — | — | — | — |
|---|---|---|---|---|---|---|---|---|---|
| Liquid crystal cell | Direction of rubbing [°] (A site in contact with the pllarizing film 1A) | 45 | 45 | 45 | 45 | 45 | 45 | 45 | 45 |
| Optical film (10B) | Film | Optical film 9 | Optical film 10 | Optical film 201 | Optical film 202 | Optical film 203 | Optical film 204 | Optical film 205 | Optical film 206 |
| Second optically anisotropic layer | Direction of slow axis [°] | 90 | 0 | 90 | 90 | 0 | 0 | 0 | 0 |
| First optically anisotropic layer | Direction of slow axis [°] | 0 | 90 | 0 | 0 | 90 | 90 | 90 | 90 |
| Sum of Re of optically anisotropic layer[nm] | | −25 | −25 | −25 | −25 | −70 | 20 | −80 | 30 |
| Support | Direction of slow axis [°] | 90 | — | 90 | 90 | — | — | — | — |
| Polarizing film (5B) | Absorption axis [°] | 90 | 90 | 90 | 90 | 90 | 90 | 90 | 90 |
| Display performance | Front CR | 4 | 4 | 1 | 1 | 3 | 4 | 2 | 4 |
| | Grayscale inversion | 3 | 3 | 3 | 3 | 3 | 3 | 3 | 3 |
| | Actual image evaluation | 3 | 4 | 3 | 3 | 3 | 3 | 3 | 3 |
| | Front transmittance | 5 | 5 | 5 | 5 | 4 | 4 | 3 | 3 |

*the values in the fields of "absorption axis" and "slow axis" indicate the azimuth angles of the axes.
When viewed from the front of the liquid crystal display, the azimuth angle increases counterclockwise from the 3 o'clock position (0°) (12 o'clock: 90°, 9 o'clock: 180°, 6 o'clock: 270°).
*optical film (10A): the optical film 10A in FIG. 4 or 5
*optical film (10B): the optical film 10B in FIG. 4 or 5

The table shows that Examples 1 to 6 which are liquid crystal displays including the optical films of the invention exhibit high front contrast, reduced grayscale inversion, and a reduced difference between a front image and an oblique image in grayscale reproducibility and color as compared to comparative examples which do not include the optical film of the invention. In contrast, Comparative examples 1 to 4 which are liquid crystal displays including comparative optical films exhibit at least one of undesirable front contrast, increased grayscale inversion, and an increased difference between a front image and an oblique image in grayscale reproducibility and color.

3. Fabrication of Optical Film Provided with Polarizing Plate Serving as Support (1) Fabrication of Protective Film The following components were introduced into a mixing tank and were agitated until they were dissolved. A core layer cellulose acylate dope 1 was prepared.

Cellulose acetate with a degree of acetylation of 2.88: 100 parts by mass
ESTER oligomer (compound 1-1): 10 parts by mass
Durability improving agent (compound 1-2): 4 parts by mass
Ultraviolet absorbing agent (compound 1-3): 3 parts by mass
Dichloromethane (a first solvent): 438 parts by mass
Methanol (a second solvent): 65 parts by mass (Compound 1-1)

Molecular weight 1000

(Compound 1-2)

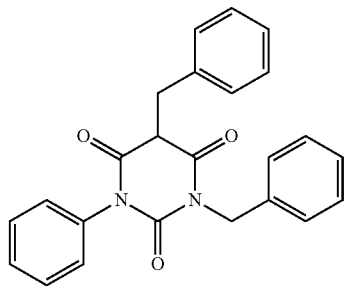

(Compound 1-3)

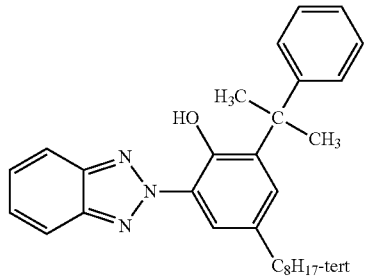

[Fabrication of External Layer Cellulose Acylate Dope 1]

Matting agent dispersant 1 (10 parts by mass) shown below was added to the core layer cellulose acylate dope (190 parts by mass) to prepare an external layer cellulose acylate dope 1.

Silica particles with an average particle size of 20 nm
2 parts by mass of AEROSIL R972 (produced by Nippon Aerosil Co., Ltd.)
Dichloromethane (a first solvent): 76 parts by mass
Methanol (a second solvent): 11 parts by mass
Core layer cellulose acylate dope 1: 1 parts by mass

[Fabrication of Cellulose Acylate Film]

The composition for the core layer cellulose acylate dope 1 and the composition for the external layer cellulose acylate dope 1 were simultaneously poured onto a drum at a temperature of 20° C. from an inlet to form a triplelayer film composed of a core layer of the core layer cellulose acylate dope 1 and layers of the external layer cellulose acylate dope 1 disposed on both sides of the core layer. At a solvent content of approximately 20 mass %, the film was stripped and the ends of the film in the width direction were fixed with tenter clips. At a residual solvent content of 3-15 mass %, the film was extended in the lateral direction 1.2 times the original length while being dried. The film was then passed between rolls of an annealing apparatus to form a cellulose acylate film having a thickness of 25 μm serving as a polarizing plate protecting film 01.

(2) Fabrication of Polarizing Plate with Protective Film on One Surface

1) Saponification of Film

The protecting film 01 was immersed in an aqueous 4.5 mol/L sodium hydroxide solution (a saponifying solution) at 37° C. for one minute, washed with water, soaked in an aqueous 0.05 mol/L sulfuric acid solution for 30 seconds, and then washed with water. The solution on the film was removed with an air knife three times, and then dried in a drying zone at 70° C. for 15 seconds to form a saponified protecting film 01 provided with a hard coat layer.

2) Fabrication of Polarizer

A polarizer having a width of 1330 mm and a thickness of 15 μm was prepared by extension in the longitudinal direction with two pairs of nip rolls having different peripheral rates, according to Example 1 of Japanese Unexamined Patent Application Publication No. 2001-141926. This polarizer served as a polarizer 1.

3) Bonding

The polarizer 1 and the saponified protecting film 01 were bonded to each other by a roll-to-roll process with an adhesive composed of an aqueous 3% PVA (PVA-117H produced by KURARAY CO., LTD.) emulsion such that the polarizing axis and the longitudinal direction of the film were orthogonal to each other to form a polarizing plate 01.

(3) Formation of Optical Film (Polarizing Plate 02)

An optical film (the optical film 8) was fabricated which included the polarizing plate (polarizing plate 01) with a protective film on one surface in place of a support. The fabrication of the optical film involved rubbing a polarizing film in the polarizing plate 01 in the rubbing direction for the optical film 8 indicated by Table 1, coating the polarizing film with a coating solution, aligning and aging the coating solution, and then irradiating the solution with UV rays for curing by polymerization.

A second retardation layer was then formed on the workpiece according to the conditions and the layer structure for the optical film 8 shown in Table 1.

An optical film (polarizing plate 02) was fabricated in the same manner as in optical film 8 except that the temperature during the alignment and aging of the first retardation layer was 70° C., the temperature during the alignment and aging related to the second retardation layer was 75° C., and the temperature of the irradiation with UV rays was 70° C.

The fabricated optical film was evaluated. The results of the evaluation were similar to those for optical film 8. The thickness of the optical film was 3 μm.

A liquid-crystal display was fabricated as in Example 4 except that the polarizing plate 02 was used. The fabricated liquid-crystal display was evaluated as in Example 4. The results of the evaluation were similar to those in Example 4.

4. Fabrication of Optical Film

The table below lists the details on and structure of the optical films of the invention including liquid crystal compounds other than rod-like and disk-like liquid crystal compounds used as coating solutions in the above table, and also lists the formulation of the coating solution. The optical film 108 included the support 4, and the other optical films included the support 2. The alignment films were the same as in the above table. The alignment films were annealed and then rubbed in a direction making an angle of 45° with the longitudinal direction of the film.

For each optical film, the tilt angle of the molecules in the discotic or rod-like liquid crystal compound were measured at a site in contact with the air interface after the formation of the first optically anisotropic layer, by KOBRA-21ADH (Oji Scientific Instruments) in the above-described process. The optical film was evaluated for repelling, bright dots, and broad irregularity in the same manner as the optical film 1.

TABLE 7

| | | Optical film 101 | Optical film 102 | Optical film 103 | Optical film 104 | Optical film 105 | Optical film 106 | Optical film 107 | Optical film 108 | Optical film 109 | Optical film 110 |
|---|---|---|---|---|---|---|---|---|---|---|---|
| Layer structure | Second optically anisotropic layer | Discotic liquid crystal | Discotic liquid crystal | Discotic liquid crystal | Rod-like liquid crystal | Discotic liquid crystal | Discotic liquid crystal | Discotic liquid crystal | Discotic liquid crystal | Rod-like liquid crystal | Rod-like liquid crystal |
| | First optically anisotropic layer | Rod-like liquid crystal | Rod-like liquid crystal | Rod-like liquid crystal | Discotic liquid crystal | Rod-like liquid crystal | Rod-like liquid crystal | Rod-like liquid crystal | Rod-like liquid crystal | Discotic liquid crystal | Discotic liquid crystal |
| Second optically anisotropic layer | Coating solution | Coating solution 4 | Coating solution 4 | Coating solution 8 | Coating solution 7 | Coating solution 4 | Coating solution 4 | Coating solution 4 | Coating solution 4 | Coating solution 7 | Coating solution 7 |
| | Re (nm) | 26 | 24 | 20 | −52 | — | 41 | 62 | — | — | −31 |
| First optically anisotropic layer | Coating solution | Coating solution 6 | Coating solution 7 | Coating solution 7 | Coating solution 8 | Coating solution 9 | Coating solution 10 | Coating solution 11 | Coating solution 12 | Coating solution 13 | Coating solution 14 |
| | Alignment film | Alignment film A | Alignment film A | Alignment film A | Alignment film A | Alignment film A | Alignment film B | Alignment film B | Alignment film B | Alignment film A | Alignment film A |
| | Re (nm) | −53 | −60 | −60 | 20 | −62 | −51 | −42 | −36 | 2 | 53 |
| | Tilt angle of the second optically anisotropic layer | 10 | 5 | 5 | 35 | 0 | 38 | 80 | 90 | 0 | 75 |

TABLE 7-continued

|  |  | Optical film 101 | Optical film 102 | Optical film 103 | Optical film 104 | Optical film 105 | Optical film 106 | Optical film 107 | Optical film 108 | Optical film 109 | Optical film 110 |
|---|---|---|---|---|---|---|---|---|---|---|---|
| Sum of Re (nm) | | −29 | −36 | −40 | −32 | Unmeasurable | −10 | 20 | Unmeasurable | Unmeasurable | 22 |
| Relation between the slow axes of the first and second optically anisotropic layers | | Orthogonal | Orthogonal | Orthogonal | Orthogonal | Indeterminable for random alignment | Orthogonal | Orthogonal | Indeterminable for random alignment | Indeterminable for random alignment | Orthogonal |
| Evaluation | Repelling | A | A | A | A | A | A | A | A | A | A |
|  | Bright dots | A | A | A | A | Indeterminable | A | A | Indeterminable | Indeterminable | A |
|  | Broad irregularity | A | A | A | A | C | A | A | C | C | A |

TABLE 8

|  |  | Coating solution 6 | Coating solution 7 | Coating solution 8 | Coating solution 9 | Coating solution 10 | Coating solution 11 | Coating solution 12 | Coating solution 13 | Coating solution 14 |
|---|---|---|---|---|---|---|---|---|---|---|
| Formulation of the coating solution | Liquid cryastal compound I | Compound 6 (100 Parts by mass) | Compound 2 (80 Parts by mass) | Compound 8 (100 Parts by mass) | Compound 2 (80 Parts by mass) | Compound 2 (80 Parts by mass) | Compound 2 (80 Parts by mass) | Compound 2 (80 Parts by mass) | Compound 8 (100 Parts by mass) | Compound 8 (100 Parts by mass) |
|  | Liquid cryastal compound II | Non-existance | Compound 7 (20 Parts by mass) | Non-existance | Compound 7 (20 Parts by mass) | Compound 7 (20 Parts by mass) | Compound 7 (20 Parts by mass) | Compound 7 (20 Parts by mass) | Non-existance | Non-existance |
|  | Initiator | Irgacure 907 BASF Co., Ltd (3 Parts by mass) | | | | | | | | |
|  | Sensitizer | Kayacure DETX Nippon Kayaku Co., Ltd (1 Parts by mass) | | | | | | | | |
|  | Alignment aid | Non-existance | Non-existance | Non-existance | Non-existance | Non-existance | Compound 9 (0.3 Parts by mass) | Compound 9 (1 Parts by mass) | Non-existance | Non-existance |
|  | Air interface rubbing agent | Compound 4 (1.0 Parts by mass) | Compound 4 (1.0 Parts by mass) | Compound 4 (0.7 Parts by mass) | Compound 10 (0.5 Parts by mass) | Non-existance | Compound 11 (1.5 Parts by mass) | Compound 11 (1.5 Parts by mass) | Compound 10 (0.6 Parts by mass) | Compound 5 (0.4 Parts by mass) |
| Formation conditions for the single layer | Solvent | Methylethylketone | | | | | | | | |
|  | Solid content | 10 Mass % | 15 Mass % | | | 10 Mass % | | | 15 Mass % | |
|  | Number of bar | #3 | #4 | | | #3 | | | #4 | |
|  | Aligned temperature | 100° C. | 125° C. | | | 100° C. | | | 125° C. | |
|  | Aligned time | 30 second | 2 minute | | | 30 second | | | 2 minute | |
|  | Polymerization temperature | 60° C. | 90° C. | | | 60° C. | | | 80° C. | |
|  | Irradiation energy | 500 mJ/cm$^2$ | | | | | | | | |
|  | Existence or non-existance of N$_2$ | Existence | | | | | | | | |

Compound 6

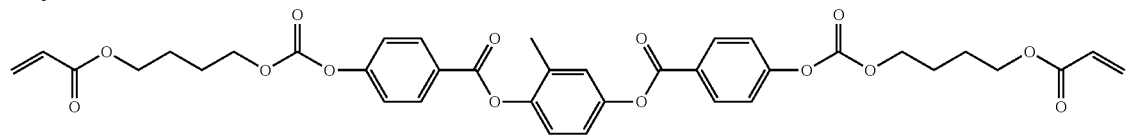

Compound 7

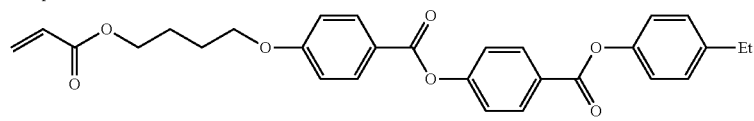

Compound 8

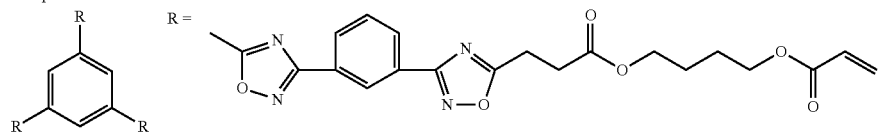

TABLE 8-continued

|  | Coating solution 6 | Coating solution 7 | Coating solution 8 | Coating solution 9 | Coating solution 10 | Coating solution 11 | Coating solution 12 | Coating solution 13 | Coating solution 14 |
| --- | --- | --- | --- | --- | --- | --- | --- | --- | --- |

Compound 9

[chemical structure]

Compound 10

[chemical structure]

Compound 11

[chemical structure]

As is evident from the results on the optical films 101 to 104, 106 to 107, and 110, liquid crystal compounds other than those in Table 4 can be used for the optical film of the invention. The results on the optical films 105, 109, and 111 show that at a tilt angle of 0° or 90° of the molecules in the first optically anisotropic layer which are present at a site in contact with the air interface, no alignment is observed in the second optically anisotropic layer, the slow axes of the first and second optically anisotropic layers are not orthogonal to each other, and many repelling portions, bright dots, and irregularities are generated. In other words, at least in a range of 5° to 80°, the slow axes are orthogonal to each other and no repelling, no bright dot, and no irregularity are generated.

The present disclosure relates to the subject matter contained in Japanese Patent Application No. 287038/2012 filed on Dec. 28, 2012, and Japanese Patent Application No. 263592/2013, filed on Dec. 20, 2013, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

The invention claimed is:

1. An optical film comprising:
a first optically anisotropic layer; and
a second optically anisotropic layer on the surface of the first optically anisotropic layer,
wherein the first optically anisotropic layer is a layer of liquid crystal compounds which are aligned and fixed by polymerization,
wherein the surface tilt angle of the liquid crystal compounds is in a range of 5° to 80° at a site in contact with the second optically anisotropic layer, and
wherein the sum of an Re value of the first optically anisotropic layer and an Re value of the second optically anisotropic layer is in a range of −75 nm to 25 nm, each Re value indicating an in-plane retardation at a wavelength of 550 nm and being measured with reference to a slow axis of the first optically anisotropic layer.

2. The optical film according to claim 1, wherein a slow axis of the first optically anisotropic layer and a slow axis of the second optically anisotropic layer are orthogonal to each other.

3. The optical film according to claim 2, wherein a surfactant is eccentrically-located at a side of the surface of the first optically anisotropic layer, the surface being in contact with the second optically anisotropic layer.

4. The optical film according to claim 2, wherein the first optically anisotropic layer contains rod-like liquid crystal compounds and the second optically anisotropic layer contains discotic liquid crystal compounds; or
wherein the first optically anisotropic layer contains discotic liquid crystal compounds and the second optically anisotropic layer contains rod-like liquid crystal compounds.

5. The optical film according to claim 2, the optical film being intended for use in a birefringent-mode liquid crystal display.

6. The optical film according to claim 1, wherein a surfactant is eccentrically-located at a side of the surface of the first optically anisotropic layer, the surface being in contact with the second optically anisotropic layer.

7. The optical film according to claim 6, wherein the first optically anisotropic layer contains rod-like liquid crystal compounds and the second optically anisotropic layer contains discotic liquid crystal compounds; or
   wherein the first optically anisotropic layer contains discotic liquid crystal compounds and the second optically anisotropic layer contains rod-like liquid crystal compounds.

8. The optical film according to claim 1, wherein the first optically anisotropic layer contains rod-like liquid crystal compounds and the second optically anisotropic layer contains discotic liquid crystal compounds; or
   wherein the first optically anisotropic layer contains discotic liquid crystal compounds and the second optically anistropic layer contains rod-like liquid crystal compounds.

9. The optical film according to claim 1, the optical film being intended for use in a birefringent-mode liquid crystal display.

10. A polarizing plate comprising:
   a polarizing film; and
   protective films on both surfaces of the polarizing film, at least one of the protective films comprising the optical film according to claim 1.

11. The polarizing plate according to claim 10, wherein at least one of the protective films is the optical film comprising:
   a first optically anisotropic layer; and
   a second optically anisotropic layer on the surface of the first optically anisotropic layer,
   wherein the first optically anisotropic layer is a layer of liquid crystal compounds which are aligned and fixed by polymerization, and
   the surface tilt angle of the liquid crystal compounds is in a range of 5° to 80° at a site in contact with the second optically anisotropic layer; and
   the polarizing film is bonded to an alignment film or an optically anisotropic layer through an adhesive layer.

12. The polarizing plate according to claim 10, wherein at least one of the protective films is the optical film according to claim 1, the optical film comprising, in sequence, the polarizing film, a support, an alignment film, the first optically anisotropic layer, and the second optically anisotropic layer.

13. A liquid crystal display comprising the polarizing plate according to claim 10.

14. A liquid crystal display comprising:
   a pair of polarizing plates; and
   a TN-mode liquid crystal cell between the pair of polarizing plates,
   wherein at least one of the pair of polarizing plates is the polarizing plate according to claim 12 and comprises the second optically anisotropic layer near to the TN-mode liquid crystal cell.

15. A liquid crystal display comprising:
   a pair of polarizing plates disposed in a birefringent mode; and
   a TN-mode liquid crystal cell between the pair of polarizing plates,
   wherein at least one of the pair of polarizing plates is the polarizing plate according to claim 12 and the second optically anisotropic layer is disposed so as to be near to the TN-mode liquid crystal cell.

16. A liquid crystal display comprising the optical film according to claim 1.

17. A method of manufacturing the optical film according to claim 1, comprising forming a second optically anisotropic layer by directly coating an unrubbed surface of the first optically anisotropic layer with a composition containing liquid crystal compounds, and aligning and fixing the liquid crystal compounds by polymerization.

18. The method of manufacturing the optical film according to claim 17, comprising forming the first optically anisotropic layer by coating of a composition comprising liquid crystal compounds and a surfactant, and aligning and fixing the liquid crystal compounds by polymerization.

* * * * *